US012564237B2

(12) United States Patent
Weber et al.

(10) Patent No.: US 12,564,237 B2
(45) Date of Patent: Mar. 3, 2026

(54) LATTICE STRUCTURE FOR IMPACT ATTENUATION

(71) Applicant: Gentex Corporation, Simpson, PA (US)

(72) Inventors: John B. Weber, Clarks Summit, PA (US); Russell J. Caspe, South Abington Township, PA (US)

(73) Assignee: Gentex Corporation, Simpson, PA (US)

( * ) Notice: Subject to any disclaimer, the term of this patent is extended or adjusted under 35 U.S.C. 154(b) by 240 days.

(21) Appl. No.: 18/254,096

(22) PCT Filed: Nov. 24, 2021

(86) PCT No.: PCT/US2021/060821
§ 371 (c)(1),
(2) Date: May 23, 2023

(87) PCT Pub. No.: WO2022/125311
PCT Pub. Date: Jun. 16, 2022

(65) Prior Publication Data
US 2024/0000182 A1 Jan. 4, 2024

Related U.S. Application Data

(60) Provisional application No. 63/118,483, filed on Nov. 25, 2020.

(51) Int. Cl.
*A42B 3/12* (2006.01)
*A42B 3/06* (2006.01)
(Continued)

(52) U.S. Cl.
CPC ................ *A42B 3/124* (2013.01); *A42B 3/06* (2013.01); *A42B 3/10* (2013.01); *A42B 3/12* (2013.01);
(Continued)

(58) Field of Classification Search
None
See application file for complete search history.

(56) References Cited

U.S. PATENT DOCUMENTS

| | | |
|---|---|---|
| 2010/0119792 A1 | 5/2010 | Ma |
| 2018/0027914 A1* | 2/2018 | Cook ........................ A42B 3/12 |
| 2018/0070736 A1* | 3/2018 | Achten ................. B29C 64/106 |

FOREIGN PATENT DOCUMENTS

| | | | |
|---|---|---|---|
| WO | 2000/012832 A2 | 3/2000 | |
| WO | WO-0012832 A2 * | 3/2000 | ......... A61B 17/1615 |

(Continued)

OTHER PUBLICATIONS

International Search Report and Written Opinion for corresponding International Patent Application No. PCT/US2021/060821 dated Sep. 8, 2022, 17 pages.

*Primary Examiner* — Chinessa T. Golden
(74) *Attorney, Agent, or Firm* — Morgan, Lewis & Bockius LLP

(57) ABSTRACT

An impact attenuation lattice structure includes a plurality of unit cells. Each of the plurality of unit cells has a horizontal plane, a central axis, and a plurality of struts that form a plurality of sidewall frames. Each of the plurality of sidewall frames are angled relative to the central axis and the horizontal plane is perpendicular to the central axis. The plurality of unit cells are connected to one another to form a lattice structure. A first unit cell of the plurality of unit cells share one sidewall frame of the plurality of sidewall frames with a second unit cell of the plurality of unit cells adjacent to the first unit cell. The second unit cell is in an inverted position about the horizontal plane compared to the first unit cell.

27 Claims, 29 Drawing Sheets

(51) Int. Cl.
    *A42B 3/10*          (2006.01)
    *F16F 7/12*          (2006.01)
    *A42B 3/04*          (2006.01)
    *B29L 31/60*        (2006.01)

(52) U.S. Cl.
    CPC .............. *A42B 3/128* (2013.01); *F16F 7/121*
             (2013.01); *A42B 3/04* (2013.01); *B29L*
                        *2031/608* (2013.01)

(56)            References Cited

FOREIGN PATENT DOCUMENTS

| WO | 2018/215491 A1 | 11/2018 | |
| WO | 2019/222718 A2 | 11/2019 | |
| WO | WO-2020102335 A1 * | 5/2020 | ............. A42B 3/064 |

\* cited by examiner

500

400

404    402

700                            400

160

102

800

1200

1200

1100

1100

LATTICE STRUCTURE FOR IMPACT ATTENUATION

CROSS-REFERENCE TO RELATED APPLICATIONS

This application claims priority to International Patent Application No. PCT/US2021/060821 filed Nov. 24, 2021, which claims the benefit of U.S. Provisional Patent Application No. 63/118,483 filed Nov. 25, 2020 entitled "Lattice Structure for Impact Attenuation", each of which is incorporated by reference herein in its entirety.

FIELD OF THE INVENTION

The present invention generally relates to a lattice structure for impact attenuation and, more particularly, to additively manufactured lattice structure for energy absorption including impact attenuation.

BACKGROUND OF THE INVENTION

Manufacturers of impact attenuation articles, such as helmet manufacturers, have long dealt with the competing requirements of increased impact performance and lower weight targets. Helmets, for example, typically have a rigid shell and a compressible liner disposed within the rigid shell. The compressible liner absorbs impact energy and reduces the amount of energy transferred to the user's head during an impact. Current technologies for impact attenuation materials are typically foam based and have a homogenous impact profile. These materials possess inherent performance limitations and often exhibit inconsistent performance over a range of operating temperatures. Due to the temperature dependence of existing liner and impact attenuation materials, the impact performance is limited to the lowest common denominator over the expected operating range, i.e. good performance at hot temperatures but bad in cold temperatures or vice-versa. The tendency of foam padding to retain moisture and lack breathability, also leads to reduced user comfort during extended use.

Further, the homogeneity of existing impact attenuation and liner technology often leads to tradeoffs in performance in different regions of the liner. For example, a stiffer foam may be optimal in one area of the helmet, but a softer foam is optimal in another area of the helmet preventing optimal performance overall with respect to weight.

BRIEF SUMMARY OF THE INVENTION

One embodiment of the present invention provides an impact attenuation lattice structure including a plurality of unit cells, each of the plurality of unit cells having a horizontal plane, a central axis, and a plurality of struts forming a plurality of sidewall frames, each of the plurality of sidewall frames angled relative to the central axis, the horizontal plane being perpendicular to the central axis. The plurality of unit cells are connected to one another to form a lattice structure, a first unit cell of the plurality of unit cells sharing one sidewall frame of the plurality of sidewall frames with a second unit cell of the plurality of unit cells adjacent to the first unit cell, and the second unit cell being in an inverted position about the horizontal plane compared to the first unit cell.

In some embodiments, each strut of the plurality of struts is coupled end to end to form each of the plurality of sidewall frames such that each of the plurality of sidewall frames forms a geometric shape. The geometric shape may be symmetrical about the horizontal plane. The geometric shape may be disposed on a plane and includes no cross members.

In some embodiments, each of the plurality of sidewall frames is connected to another of the plurality of sidewall frames by one or more spacing struts. The spacing strut may be disposed along the horizontal plane.

In some embodiments, the lattice structure is formed by the plurality of unit cells arranged such that vertically adjacent unit cells are positioned inversely about the horizontal plane relative to each other. The lattice structure may be formed by at least six unit cells arranged such that horizontally adjacent unit cells are positioned inversely about the horizontal plane relative to each other.

In some embodiments, the lattice structure is formed by the plurality of unit cells arranged such that horizontally adjacent unit cells are positioned inversely about the horizontal plane relative to each other.

In some embodiments, each of the plurality of sidewall frames is symmetrical about a horizontal plane. Each of the plurality of sidewall frames may be a closed shape comprising the plurality of struts. Each of the plurality of sidewall frames may include no cross members. Each of the plurality of unit cells may share at least three sidewall frames. Each of the plurality of unit cells may share three sidewall frames with an adjacent unit cell. Each of the plurality of unit cells may share at least two sidewall frames with an adjacent unit cell. Each of the plurality of sidewall frames may be substantially diamond shaped, substantially rectangular shaped, substantially triangular shaped, substantially bowtie shaped, substantially hexagonal shaped, and/or substantially elliptical shaped.

In some embodiments, each of the plurality of sidewall frames is angled relative to the central axis from greater than 0° to less than or equal to 30°. Each of the plurality of sidewall frames may include an internal angle disposed between two connected struts forming the sidewall frame, the internal angle being from 60° to 280°.

In some embodiments, each of the plurality of sidewall frames includes an auxetic geometry having an internal angle disposed between two connected struts forming the sidewall frame, the internal angle being greater than or equal to 180°.

In some embodiments, one of the plurality of sidewall frames of one unit cells is adjacent to another of the plurality of sidewall frames of the same unit cell without horizontal overlap between the one and the other plurality of sidewall frames.

In some embodiments, the impact attenuation lattice structure further includes a plurality of layers comprised of at least two lattice structures, wherein the at least two lattice structures are stacked vertically such that one lattice structure is vertically adjacent to another lattice structure.

In some embodiments, each of the plurality of sidewall frames is disposed on a plane. Each of the plurality of sidewall frames may include a top and a bottom, the top being proximate to the central axis compared to the bottom.

In some embodiments, the lattice structure is non-continuous and includes an impact pad.

Another embodiment of the present invention provides a helmet including a helmet shell having an inner surface and a liner coupled to the inner surface of the helmet shell, wherein at least one zone of the liner is comprised of a tessellation of the impact attenuation lattice structure of claim 1.

Another embodiment of the present invention provides an impact attenuation lattice structure including a plurality of unit cells, each of the plurality of unit cells having a horizontal plane, a central axis perpendicular to the horizontal plane, and a plurality of struts forming a plurality of sidewall frames, each sidewall frame having a geometric shape devoid of cross members and being angled relative to the central axis, each of the plurality of sidewall frames disposed along a perimeter of the unit cell and coupled together by one or more spacing struts. The plurality of unit cells are connected to one another to form a lattice structure, a first unit cell of the plurality of unit cells sharing one sidewall frame of the plurality of sidewall frames with a second unit cell of the plurality of unit cells adjacent to the first unit cell, the second unit cell being in an inverted position about the horizontal plane compared to the first unit cell.

In some embodiments, each of the plurality of sidewall frames is angled relative to the central axis by between greater than 0° and less than or equal to 30° and each of the plurality of sidewall frames includes a top and a bottom, the top being proximate the central axis compared to the bottom and each of the plurality of sidewall frames includes an internal angle disposed between two connected struts forming the sidewall frame, the internal angle being from 60° to 280°.

Another embodiment of the present invention provides a helmet system including a helmet having an exterior shell and an interior surface, and an impact pad coupled to at least a portion of the interior surface of the helmet, the impact pad being comprised of at least one zone of an impact attenuation lattice structure having a plurality of unit cells, each of the plurality of unit cells having a horizontal plane, a central axis perpendicular to the horizontal plane, and a plurality of struts coupled end to end to form a plurality of sidewall frames such that each of the plurality of sidewall frames forms a geometric shape, each of the plurality of sidewall frames disposed along a perimeter of the unit cell and coupled together by one or more spacing struts disposed along the horizontal plane, and each of the plurality of sidewall frames being angled relative to each of the central axes between greater than 0° and less than or equal to 30°.

In some embodiments, the plurality of unit cells are connected to one another to form a lattice structure, a first unit cell of the plurality of unit cells sharing one sidewall frame of the plurality of sidewall frames with a second unit cell of the plurality of unit cells adjacent to the first unit cell, the second unit cell being in an inverted position about the horizontal plane compared to the first unit cell.

In some embodiments, each of the plurality of sidewall frames includes a top and a bottom, the top being closer to the central axis than the bottom and each of the plurality of sidewall frames includes an internal angle disposed between two connected struts forming the sidewall frame, the internal angle being between 60° and 280°.

In some embodiments, the impact pad includes multiple discrete pads. The impact pad may be a single continuous lattice structure.

BRIEF DESCRIPTION OF THE SEVERAL VIEWS OF THE DRAWINGS

The following detailed description of embodiments of the lattice structure for impact attenuation will be better understood when read in conjunction with the appended drawings of exemplary embodiments. It should be understood, however, that the invention is not limited to the precise arrangements and instrumentalities shown.

In the drawings.

DETAILED DESCRIPTION OF THE EXEMPLARY EMBODIMENTS OF THE INVENTION

Figure 1:
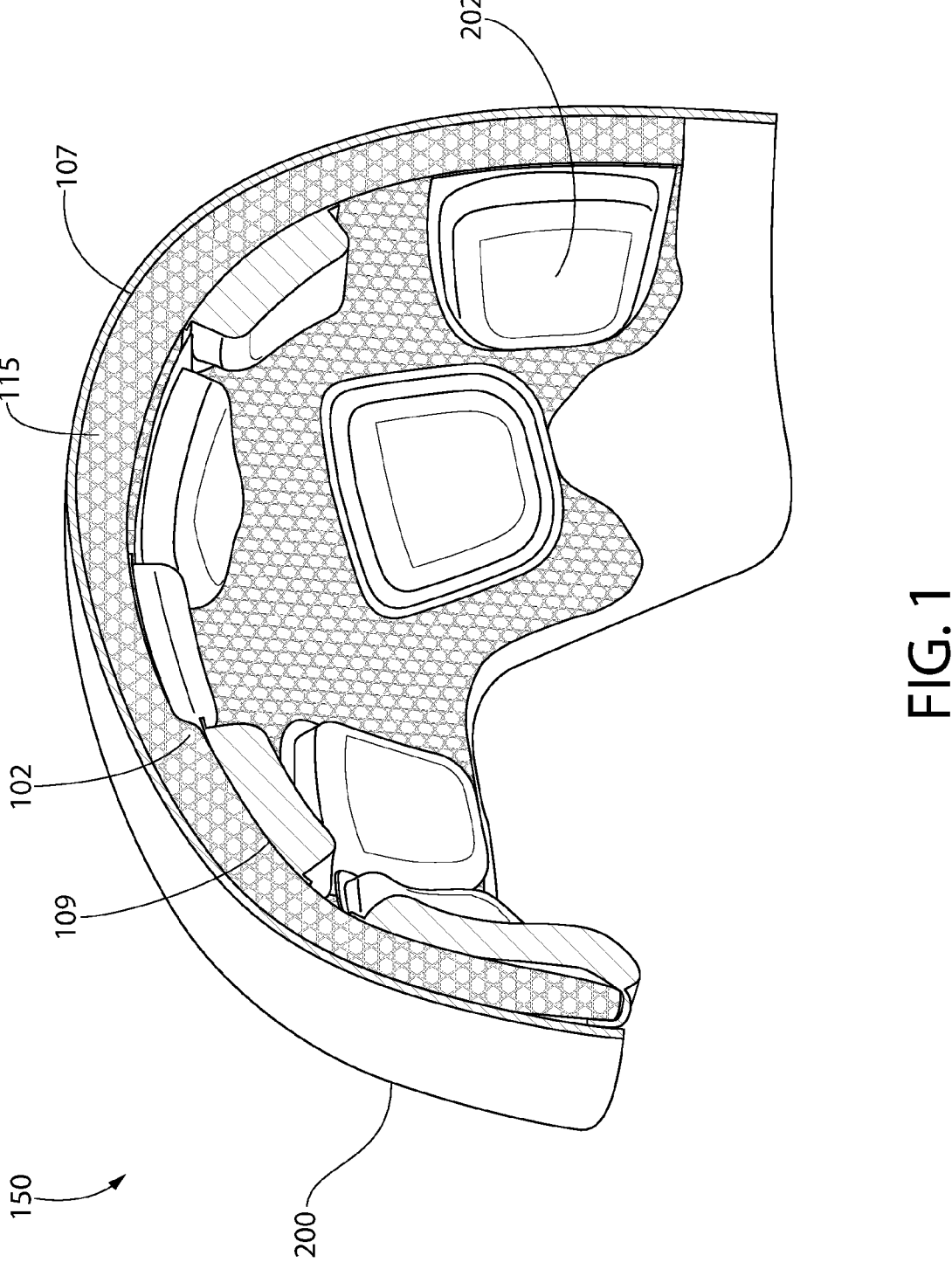
FIG. 1 is a cross-sectional view of the helmet impact attenuation liner in accordance with an exemplary embodiment of the present invention.

Impact attenuation materials and structures are used in a variety of environments and for various purposes including adventure activities, sporting, and police or military purposes. For example, impact attenuation materials and structures are needed for a variety of applications such as dental, medical devices, automobiles, transportation, sporting goods, shoes, military equipment, packaging, playground equipment or any other application for providing impact attenuation. For example, helmets may require the use of impact attenuation materials or structures since helmets provide protection against projectiles and blunt force impacts. Helmets typically include a helmet shell having a peripheral edge and a retention system (e.g., chinstrap) that may be attached to helmet shell. Helmets also typically include a liner system comprised of a compressible material coupled to an inside surface of the helmet shell for comfort and impact energy absorption. The liner system may be composed of a single contiguous structure or multiple distinct structures either of which may or may not completely cover the surface of the helmet shell. The need for a comfortable liner with high impact attenuation performance is particularly important for defense forces, emergency responders, and industrial personnel operating in highly demanding environments, as well as individuals wearing helmets for extended periods of time.

Referring to FIGS. 1-3 and 22-26 wherein like reference numerals indicate like elements throughout, there is shown an impact attenuation liner system 100, generally designated 100, in accordance with an exemplary embodiment of the present invention. In some embodiments of the present invention, impact attenuation liner system 100 includes lattice structure 102. In one embodiment, impact attenuation liner system 100 may be used as a drop-in replacement for the impact liner of an existing helmet. In another embodiment, impact attenuation liner system 100 may be used as a fully integrated system with the helmet. In some embodiments, impact attenuation liner system 100 is used in a variety of applications such as dental, medical devices, automobiles, transportation, sporting goods, shoes, military equipment, packaging, playground equipment, construction, or any other application that requires impact attenuation.

Figure 2:
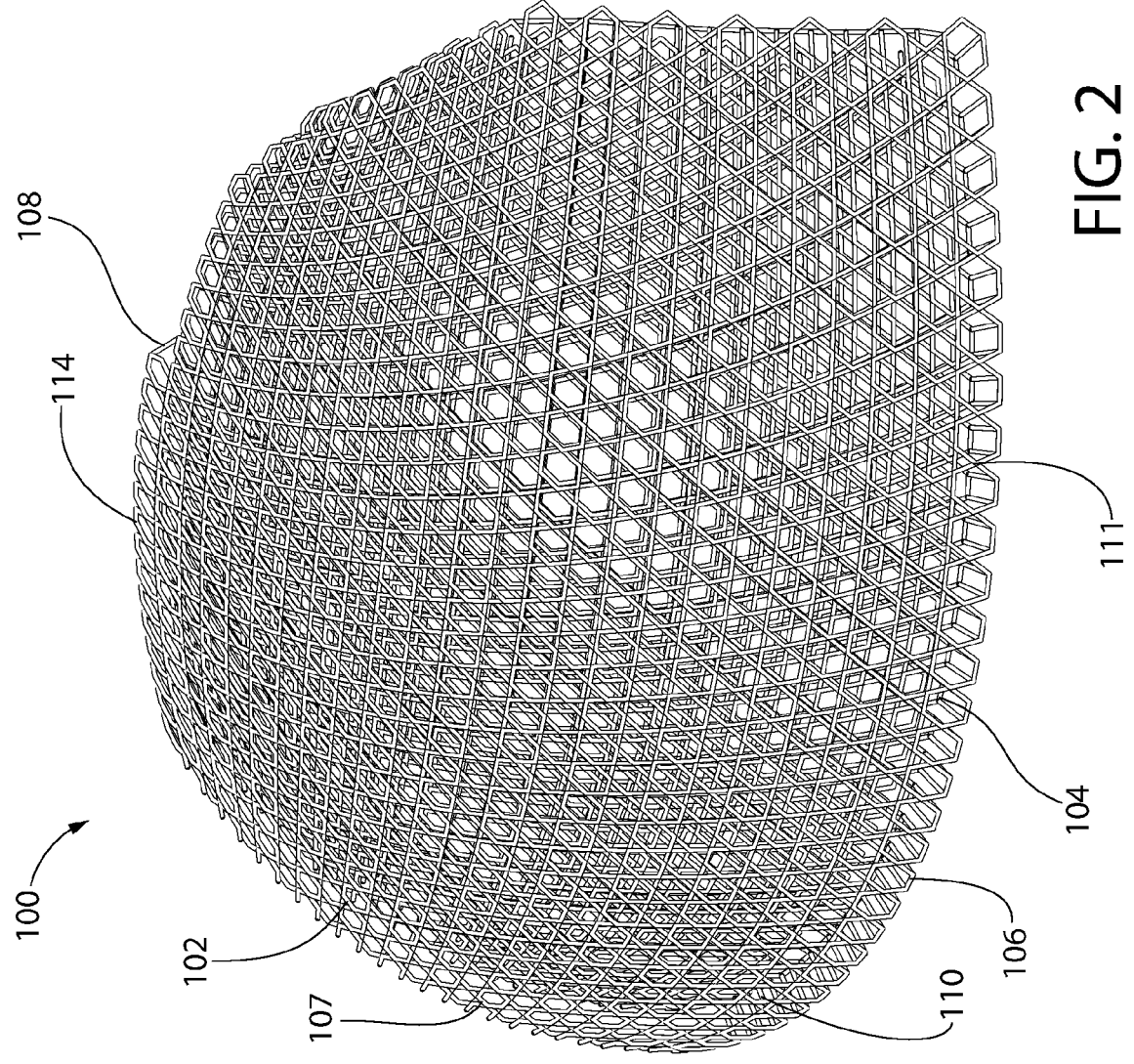
FIG. 2 is a front perspective view of a portion of a helmet impact attenuation liner in accordance with an exemplary embodiment of the present invention.
Figure 3:
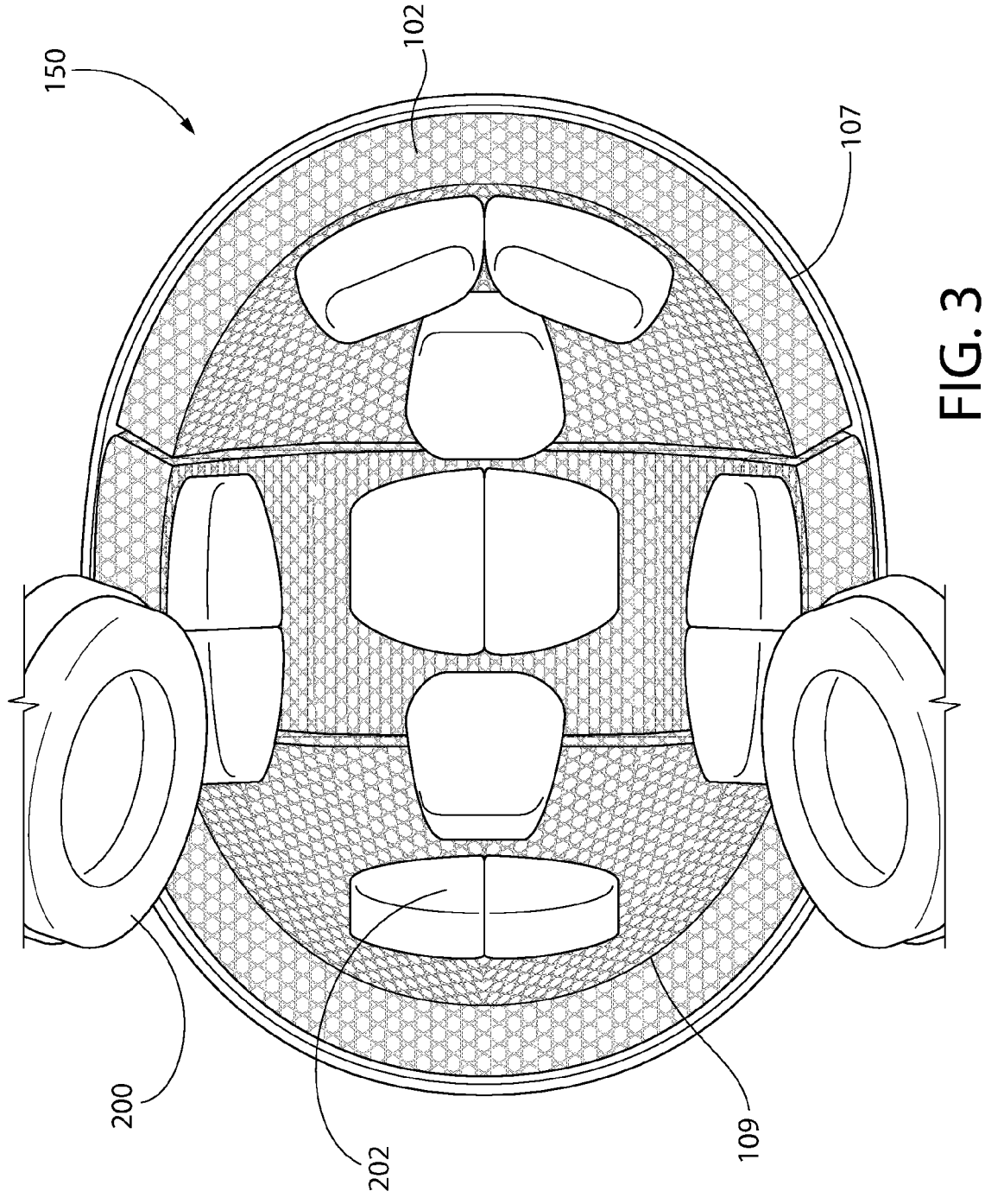
FIG. 3 is a bottom view of an impact attenuation liner system in accordance with an exemplary embodiment of the present invention shown inside a helmet.

Referring to FIGS. 1-3, lattice structure 102 may be an additively manufactured lattice structure. In some embodiments, lattice structure 102 is configured to be positioned within an interior region of a head protection device, such as helmet 200, or placed into another device or article for providing impact attenuation. Lattice structure 102 may be configured to be positioned between an outer shell of helmet 200 and a user's head during use and may be configured to provide impact protection and attenuation to the user. In some embodiments, lattice structure 102 is disposed anywhere within helmet 200, such as between layers of helmet 200. However, lattice structure 102 may be disposed within any product, article, or device configured to provide impact attenuation. For example, lattice structure 102 may be disposed within a wearable garment to provide impact protection and attenuation to the body and/or limbs of the user. Lattice structure 102 may be used in an article or machine, such as within an automobile, to provide impact protection and attenuation to a user using the article or machine.

In one embodiment, lattice structure 102 is shaped such that it retains the same shape whether or not it is coupled to the helmet 200 and/or the user's head. In some embodiments, lattice structure 102 is dimensioned to fit along the interior of helmet 200 from the front of helmet 200 to the back of helmet 200. In some embodiments, lattice structure 102 is configured to entirely fit within the interior of helmet 200 and to not extend beyond the periphery of helmet 200 during use. In some embodiments, lattice structure 102 may be removably coupled to helmet 200. In another embodiment, lattice structure 102 is fixedly coupled to the interior surface of helmet 200. In yet another embodiment, lattice structure 102 is integrally formed with helmet 200.

Helmet 200 may be any type of head protection helmet known in the art. For example, helmet 200 may be any type of head protection used for sporting, industrial safety, police, or military purposes. In certain embodiments, helmet 200 is a standard infantry ballistic helmet. In some embodiments, helmet 200 is an advanced combat helmet (ACH), an enhanced combat helmet (ECH), a modular integrated communications helmet (MICH), a tactical ballistic helmet (TBH), a lightweight marine helmet, police general duty helmet, a personnel armor system for ground troops (PASGT), or an aircrew helmet, such as an HGU-56/P rotary wing helmet or an HGU 55/P fixed wing helmet. In one embodiment, helmet 200 may be manufactured with additive manufacturing such as 3D printing and may include a 3D printed shell. For example, helmet 200 may be comprised of a 3D printed outer shell with an integrated 3D printed energy absorbing lattice layer, such as lattice structure 102. Lattice structure 102 may be configured to provide protection to a user's head, in addition to decreasing the overall weight of helmet 200 compared to traditional liners and helmets. For example, lattice structure 102 may be comprised of lightweight, yet strong material, to decrease the overall weight of lattice structure 102 while still providing impact protection and attenuation. In some embodiments, lattice structure 102 may be manufactured as a single structure or assembled from separate components.

In some embodiments, lattice structure 102 may be a 3D printed lattice structure. The 3D printed lattice structure may be comprised of a single use crushable material. In some embodiments, the material is configured to withstand or rebound from minor impacts but is also configured to deformably crush to absorb larger impacts. By deforming without rebounding, the energy may be more effectively absorbed and attenuated without transferring to the user's head.

Lattice structure 102 may be made by using additive manufacturing, such as 3D printing. Additive manufacturing may allow for specific geometries within lattice structure 102 that may not be manufactured using traditional techniques, such as injection molding. Additive manufacturing may allow for lattice structure 102 to be comprised of different materials thereby varying the impact properties of lattice structure 102. Using a 3D printer, lattice structure 102 may be created with varying layers of different materials based on the impact attenuation performance desired. For example, lattice structure 102 may be a hybridization of different impact attenuating materials such as a sheet of aluminum arranged in a honeycomb geometry with a lattice structure, a lattice with expanded polystyrene (EPS), a lattice with expanded polypropylene (EPP), a lattice with polyurethane foam, or a lattice with other aluminum honeycomb, polymeric cellular, polymeric engineered, composite cellular, or composite engineered structures.

In one embodiment, the lattice structure 102 is comprised of polyurethane. Lattice structure 102 may be comprised of generally rigid polyurethane. In some embodiments, a generally rigid material refers to a non-elastic material. Lattice structure 102 may be comprised of a generally rigid material, such as polyurethane, such that lattice structure 102 is permanently crushed when deformed. In some embodiments, lattice structure 102 is comprised of a material configured to deform non-elastically. In some embodiments, lattice structure 102 may include both elastic material and non-elastic material. For example, lattice structure 102 may include a layer of elastic material and a layer of non-elastic material. Lattice structure 102 may include one or more layers of polyurethane.

In some embodiments, lattice structure 102 is at least partially comprised of polymeric segments. Lattice structure 102 may be comprised of one or more of polyurethane, polyamide, glass reinforced composites, carbon reinforced composites, thermoplastic polymer such as acrylonitrile butadiene styrene (ABS), polycarbonate, polyetherimide (PEI), polyetheretherketone (PEEK), thermoset polymer such as acrylic polyurethanes, methacrylic polyurethanes, polyurea, polyacrylates, polymethacrylates and polyepoxides. Lattice structure 102 may also be comprised of one or more of metallic or ceramic materials. In some embodiments, preferred materials have a high specific modulus and exhibit significant toughness. In general, materials fitting these criteria tend to be rigid polymers with elastomers performing poorly due to low specific moduli. In one embodiment, a preferred material has an elastic modulus greater than or equal to approximately 750 MPa. For example, the material may have an elastic modulus between approximately 750 MPa and 100 GPa. In one embodiment, the strain at failure is greater than approximately 40%. For example, lattice structure 102 may begin to fail when it is strained/elongated to greater than approximately 40% of its size.

In one embodiment, lattice structure 102 may be configured to maintain impact performance over a range of varying temperature conditions. For example, lattice structure 102 may be configured to maintain impact performance from approximately –60° F. to approximately 180° F., approximately –40° F. to approximately 160° F., approximately –20° F. to approximately 140° F., approximately 0° F. to approximately 120° F., approximately 20° F. to approximately 100° F., or approximately 40° F. to approximately 80° F. In one embodiment, lattice structure 102 may be configured to maintain impact performance over multiple impact events at high impact velocities. For example, lattice structure 102 may be configured to maintain impact performance at impact velocities greater than or equal to approximately 3.0 m/s, approximately 4.25 m/s, approximately 5.2 m/s, approximately 6.0 m/s, approximately 6.5 m/s, approximately 7.0 m/s, approximately 8.5 m/s, approximately 9.5 m/s, or approximately 10.5 m/s. In one embodiment, lattice structure 102 may be configured to maintain impact performance over multiple impact events at high impact energies. For example, lattice structure 102 may be configured to maintain impact performance at impact energies greater than or equal to approximately 35 ft-lb, approximately 45 ft-lb, approximately 55 ft-lb, approximately 65 ft-lb, or approximately 75 ft-lb. Lattice structure 102 may be configured to maintain impact performance at impact energies from approximately 25 ft-lb to approximately 150 ft-lb. Lattice structure 102 may be created to match a single user's cranial profile. For example, lattice structure 102 may be created via additive manufacturing, such as 3D printing, to match the cranial profile of a user and may not require the use of individualized tooling or hard tooling.

Referring to FIGS. 1 and 2, lattice structure 102 may include a plurality of layers 114, each layer 114 comprising cells 104, which may be comprised of struts or walls 106. In one embodiment, cells 104 may have a geometry resembling a parallelepiped. However, cells 104 may be other shapes such as frustum, cylinder, cone, pyramid, polygonal, spherical, or combinations thereof. In one embodiment, struts 106 are hollow to decrease the overall weight of lattice structure 102 and impact attenuation liner system 100. However, struts 106 being hollow may not decrease the ability of lattice structure 102 to provide impact protection and attenuation. Lattice structure 102 may include nodes 111. Nodes 111 may be joints (e.g., intersection points) where struts 106 meet and connect. Cells 104 and struts 106 may be comprised of polyurethane and may be manufactured via additive manufacturing, such as 3D printing. However, cells 104 and struts 106 may be comprised of other materials such as polyamide, glass reinforced composites, carbon reinforced composites, thermoplastic polymer such as ABS, polycarbonate, PEI, PEEK, thermoset polymer such as acrylic polyurethanes, methacrylic polyurethanes, polyurea, polyacrylates, polymethacrylates, polyepoxides, or any combinations thereof. Cells 104 and struts 106 may also be comprised of one or more of metallic or ceramic materials. Struts 106 may have a length and thickness (diameter), which may affect the thickness and size of lattice structure 102. For example, struts 106 may have an aspect ratio ranging from 1:1 to 1:120. In one embodiment, the length and thickness of struts 106 affect the impact attenuation properties of lattice structure 102.

Referring to FIGS. 1-3, lattice structure 102 may include top surface 107 and bottom surface 109. In one embodiment, top surface 107 may have a convex curvature and bottom surface 109 may have a concave curvature shaped to receive the user's head. Lattice structure 102 may include front region 108 and back region 110. Front region 108 may be proximate to the user's forehead, and back region 110 may be proximate to the back of the user's head and opposite front region 108. In one embodiment, struts 106 of back region 110 may have a thickness greater than struts 106 of front region 108. In some embodiments, lattice structure 102 may have a first region with struts 106 having a thickness greater than struts 106 of a second region. In some embodiments, lattice structure 102 includes multiple regions having struts 106 of different thicknesses. In some embodiments, a transition region is disposed between regions having struts 106 of different thicknesses. For example, a transition region may be disposed between front region 108 and back region 110 when front region 108 includes struts 106 having a different thickness than struts 106 of back region 110. The transition region may be an area where of struts 106 transition to struts 106 of increased thickness or decreased thickness. For example, struts 106 of back region 110 may have a ratio of strut length to strut thickness of 1:20 and struts 106 of front region 108 may have a ratio of strut length to strut thickness of 1:10. Struts 106 of back region 110 may have a greater thickness than struts 106 of front region 108 to provide increased impact protection and attenuation to the back of a user's head.

In one embodiment, struts 106 of back region 110 may have a stiffness greater than struts 106 of front region 108. In some embodiments, lattice structure 102 may have a first region with struts 106 having a first level of stiffness greater than struts 106 of a second region. In some embodiments, lattice structure 102 includes multiple regions having struts 106 of different stiffness levels. A transition region may be disposed between regions having struts 106 of different stiffness levels, such as front region 108 and back region 110. The transition region may be an area where of struts 106 transition to struts 106 of increased stiffness or decreased stiffness.

In some embodiments, the stiffness of one or more regions of lattice structure 102 varies based on the geometry of cells 104. For example, different sizes and shapes of cells 104 may result in different stiffness levels. In some embodiments, lattice structure 102 has a first region with cells 104 having a first geometry and a second region with cells 104 having a second geometry different than the first geometry. The different geometries of cells 104 of the first region and the second region may result in struts 106 of the first region having a level of stiffness greater than or less than struts 106 of the second region.

Referring to FIGS. 1 and 3, impact attenuation liner system 100 may be used within helmet system 150. Helmet system 150 may include additional materials to provide for increased impact attenuation and/or comfort. For example, impact attenuation liner system 100 may include a comfort liner secured to bottom surface 109 of lattice structure 102. The comfort liner may be configured to provide additional impact attenuation and/or comfort. In some embodiments, impact attenuation liner system 100 includes a plurality of comfort pads 202 secured to bottom surface 109 of lattice structure 102. Pads 202 may each be configured to provide cushioning between the user's head and lattice structure 102 during use. Pads 202 may be moveable by the user to position pads 202 based on user preference and head geometry. In some embodiments, a total of two to twelve pads 202 are provided with impact attenuation liner system 100 and are coupled to lattice structure 102. Impact attenuation liner system 100 may be provided with three, four, five, six, seven, eight, nine, or ten pads 202. In one embodiment, each of pads 202 has substantially the same shape. In another embodiment, pads 202 may include different shapes. Pads 202 may be square, rectangular, circular, polygonal, or irregularly shaped. Each pad 202 may have a thickness in a range from about 6 mm to about 20 mm, about 8 mm to about 18 mm, about 10 mm to about 16 mm, or about 12 mm to about 14 mm before compression. In one embodiment, each pad 202 is at least 6 mm thick, at least 8 mm thick, at least 12 mm thick, at least 14 mm thick, at least 16 mm thick, or at least 18 mm thick before compression. In one embodiment, each pad 202 is about 13 mm thick before compression. In other embodiments, each pad 202 has a width of about 40 to about 60 mm and a length of about 80 mm to about 110 mm. In one embodiment, each pad 202 has a width of about 50 mm and a length of about 95 mm.

In one embodiment, pads 202 are made from a material that is different than the material used to construct lattice structure 102. Pads 202 may include a soft or resilient material, such as compressible foam. Pads 202 may include a gel material. In one embodiment, pads 202 include a viscoelastic material or an elastomeric material. In a preferred embodiment, pads 202 are constructed from a breathable material. In some embodiments, pads 202 are manufactured via additive manufacturing, such as 3D printing. In one embodiment, each of pads 202 is made from reticulated foam that is enclosed in fabric. Pads 202 may include a foam that is less dense than the impact-absorbing material of lattice structure 102. In one embodiment, pads 202 include plastic open cell reticulated foam enclosed in a fleece material. In one embodiment, pads 202 are made from materials that do not substantially absorb or retain water. For example, pads 202 may include foam having open cells that allow for drainage of water. In one embodiment, pads 202 are made from materials that absorb less water than certain polyurethane foams, such as those available under the ZOR-BIUM® brand. In another embodiment, pads 202 may be made from materials that absorb moisture.

In some embodiments, lattice structure 102 may be configured to be non-continuous. For example, lattice structure 102 may be sized and shaped to be individual lattice pads disposed within helmet system 150. For example, lattice structure 102 may be a plurality of lattice pads, sized and shaped similarly to pads 202. The plurality of lattice pads may be secured to helmet 200. The plurality of lattice pads may each be configured to provide impact attenuation between the user's head and helmet 200. In some embodiments, the plurality of lattice pads may be moveable by the user to position the lattice pads based on user preference and head geometry. In some embodiments, a total of two to twelve lattice pads are provided with impact attenuation liner system 100 and are coupled to the interior of helmet 200. In one embodiment, each of the plurality of lattice pads has substantially the same shape. In another embodiment, the plurality of lattice pads may include different shapes. The plurality of lattice pads may be square, rectangular, circular, polygonal, or irregularly shaped. In some embodiments, the plurality of lattice pads may include one or more of the different configurations of lattice structure 102 discussed herein. For example, one of the plurality of lattice pads may include cells 104 having a frustum geometry and another one of the plurality of lattice pads may include cells 104 having a cross-linked (3,3) carbon nanotube geometry. The plurality of lattice pads may have a thickness ranging from approximately 0.1 mm to approximately 30 mm, approximately 0.5 mm to approximately 25 mm, approximately 1 mm to approximately 20 mm, or approximately 10 mm to approximately 15 mm.

In some embodiments, lattice structure 102 is divided into a plurality of islands. Lattice structure 102 may be divided into a plurality of discrete segments to decrease the amount of lattice structure 102 within helmet system 150. For example, lattice structure 102 may be configured to be a plurality of discrete segments to decrease the overall weight of helmet 200 or to allow space for additional interior components, such as pads 202. In some embodiments, lattice structure 102 is configured to be a plurality of discrete segments, with pads 202 disposed between the plurality of discrete segments.

Figure 4:
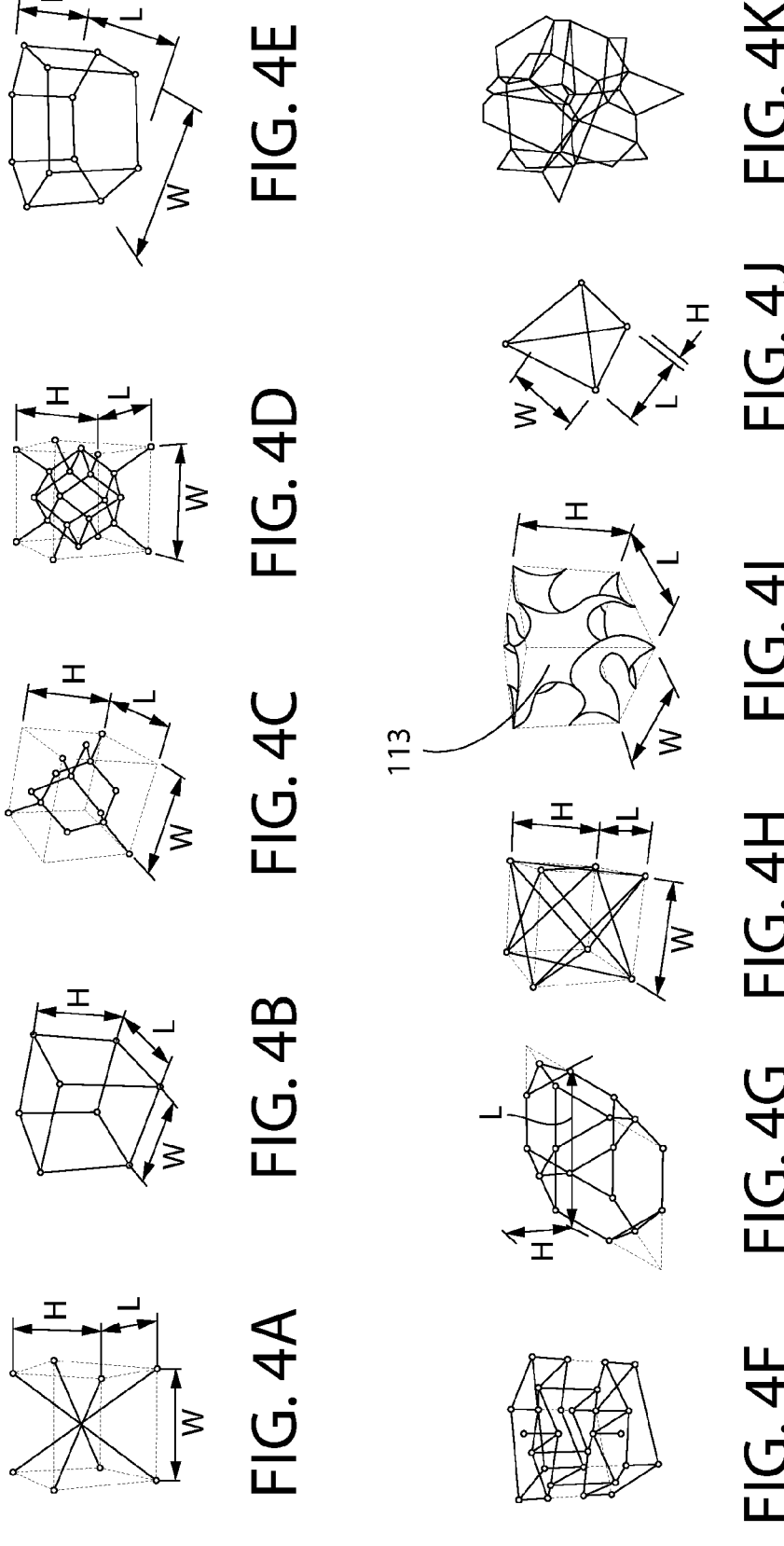
FIGS. 4A-4K illustrate exemplary lattice cell geometries that may be used in the helmet impact attenuation liner.

Referring to FIGS. 2, 4A-4K, and 9A-9F lattice structure 102 may include cells 104, which may be various sizes and shapes. Cells 104 may be the same shape and size throughout lattice structure 102 or cells 104 may be different shapes and sizes throughout lattice structure 102. Cells 104 may be arranged within lattice structure 102 in a specific geometry. For example, cells 104 may be arranged in a body centered cubic geometry (FIG. 4A), a cubic geometry (FIG. 4B), a diamond geometry (FIG. 4C), a fluorite geometry (FIG. 4D), a hexagonal prism geometry (FIG. 4E), an auxetic geometry (FIG. 4F), a 3D kagome geometry (FIG. 4G), a face centered cubic geometry (FIG. 4H), a gyroid geometry (FIG. 4I), a tetrahedral geometry (FIG. 4J), or a voronoi geometry (FIG. 4K). In one embodiment, cells 104 may be arranged in a combination of different geometries. A first region of lattice structure 102 may have cells 104 having a different geometry than cells 104 of a second region of lattice structure 102. For example, front region 108 of lattice structure 102 may have cells 104 arranged in a one geometry and back region 110 of lattice structure 102 may have cells 104 arranged in a different geometry.

Referring to FIGS. 4G and 5-7, cells 104 may be arranged in a 3D kagome (tri-hexagonal) geometry. The 3D kagome geometry may be similar to tri-hexagonal tiling, but in 3D geometry. The 3D kagome geometry of cells 104 may resemble a parallelepiped. In some embodiments, when cells 104 are viewed as a layer, the cross-sectional view of the parallelepiped of cells 104 resembles a hexagonal prism. Viewing cells 104 as a layer results in the parallelepiped geometry of cells 104 resembling tetrahedrons and hexagonal prisms arranged such that each side face of the hexagonal prism is shared with a face of an adjacent tetrahedron. For example, the cross-sectional view of cells 104 of the 3D kagome lattice structure may show each hexagonal prism of the including six tetrahedrons disposed around the perimeter of the hexagonal prism. The tetrahedrons may be connected at their vertices such that each tetrahedron has another tetrahedron connected at each of its vertices.

Figure 5:
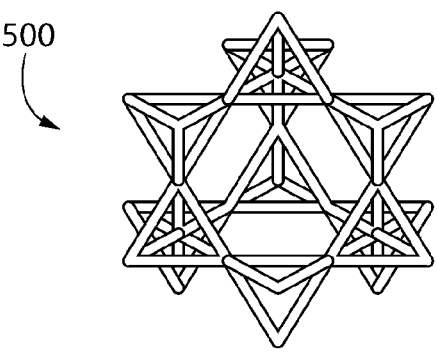
FIG. 5 is an exemplary kagome lattice structure that may be used in the helmet impact attenuation liner.
Figure 6:
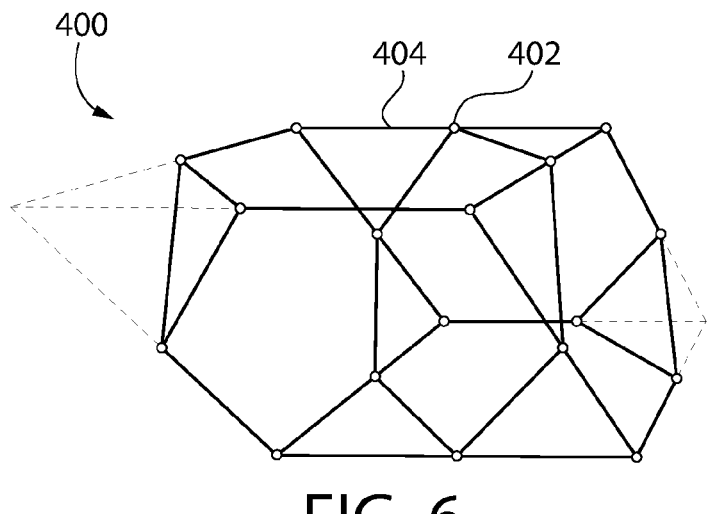
FIG. 6 is an exemplary kagome lattice unit cell that may be used in the helmet impact attenuation liner.

The 3D kagome geometry of cells 104 results in lattice structure 102 having a rigid and efficient structure for absorbing energy. The 3D kagome geometry of cells 104 may result in absorption of energy associated with low velocity blunt force impacts. For example, cells 104 may be configured to attenuate impact in response to an impact event having a velocity greater than or equal to approximately 4 m/s, approximately 5 m/s, approximately 6 m/s, approximately 7 m/s, approximately 8 m/s, approximately 9 m/s, or approximately 10 m/s. In some embodiments, cells 104 are configured to attenuate impact in response to an impact event having a velocity greater than or equal to approximately 4.25 m/s, approximately 5.2 m/s, approximately 6.50 m/s or approximately 7.0 m/s. Referring to FIG. 5, cells 104 may be in the shape of 3D kagome geometry 500, which forms a series of tetrahedral elements joined at the vertices when tessellated to fill a volume. The microstructure of 3D kagome geometry 500 can be exploited by additively manufacturing a macroscopic analog, such as via 3D printing. Referring to FIG. 6, cell 104 may be unit cell 400 having a 3D kagome structure. Unit cell 400 may have nodes 402 and struts 404.

Figure 7:
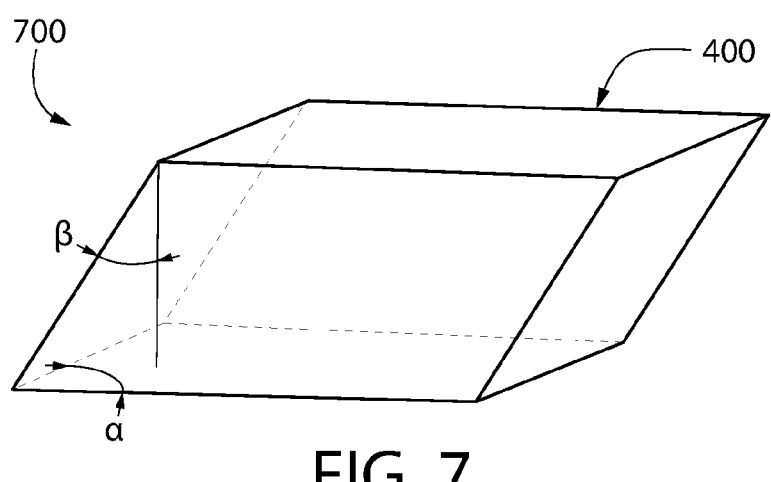
FIG. 7 is an exemplary parallelepiped unit cell volume for a kagome unit cell that may be used in the helmet impact attenuation liner.

Referring to FIG. 7, unit cell 400 may be visualized as parallelepiped 700. Parallelepiped 700 may illustrate the bounding volume of unit cell 400. Unit cell 400 may have critical angles α and β. Critical angles α and β may allow the structural response of the unit cell and by connection the lattice as a whole to be tuned to exhibit the desired behavior when subjected to impact.

In one embodiment, the density of lattice structure 102 may be altered by changing the size and shape of cells 104 and struts 106 via additive manufacturing. By changing the size and shape of cells 104 and struts 106, the density and impact properties of lattice structure 102 may be altered in a single additive manufacturing step. In one embodiment, cells 104 may be comprised of different materials throughout lattice structure 102. For example, cells 104 may be made of varying materials throughout the thickness of lattice structure 102. Cells 104 may have a size ranging from approximately 0.1 mm to approximately 30 mm, approximately 0.5 mm to approximately 25 mm, approximately 1 mm to approximately 20 mm, or approximately 10 mm to approximately 15 mm. In a preferred embodiment, the size of cells 104 is approximately 5 mm. Struts 106 may have a thickness ranging from approximately 0.1 mm to approximately 5 mm, approximately 0.5 mm to approximately 3 mm, or approximately 1 mm to approximately 2 mm. The ratio of the thickness of struts 106 to the size of cells 104 may vary. For example, the ratio of the thickness of struts 106 to the size of cells 104 may range from approximately 1:1 to approximately 1:300, approximately 1:50 to approximately 1:250, or approximately 1:100 to approximately 1:200. In a preferred embodiment, the ratio of the thickness of struts 106 to the size of cells 104 ranges from approximately 1:4 to approximately 1:120.

Further, the ratio of the thickness of struts 106 to the length of struts 106 may vary. For example, the ratio of the thickness of struts 106 to the length of struts 106 may range from approximately 50:1 to approximately 1:300, approximately 25:1 to approximately 1:200, or approximately 1:1 to approximately 1:100. In a preferred embodiment, the ratio of the thickness of struts 106 to the length of struts 106 ranges from approximately 1:4 to approximately 1:60. The density of struts 106 per node 111 may vary. In one embodiment, density of struts 106 per node 11 is the number of struts 106 that meet at each node 111. This number may differ based on the desired geometries of cells 104. For example, density of struts 106 per node may range from approximately 1:1 to approximately 1:20, approximately 1:1 to approximately 1:15 or approximately 1:5 to approximately 1:10.

Referring to FIG. 1, cells 104 within lattice structure 102 may be arranged to create a network of channels within lattice structure 102. For example, the arrangement of cells 104 within lattice structure may create a continuous network of channels 115 to provide for improved airflow and breathability through lattice structure 102. In one embodiment, channels 115 of lattice structure 102 may provide airflow and increase breathability compared to standard liners, resulting in a significant increase in a user's comfort. Lattice structure 102 may also include channels 115 to allow for threading of cables and wires for cable management during use of impact attenuation liner system 100. Channels 115 disposed within lattice structure 102 may be configured to not affect or sacrifice the impact attenuation performance of impact attenuation liner system 100.

Figure 8:
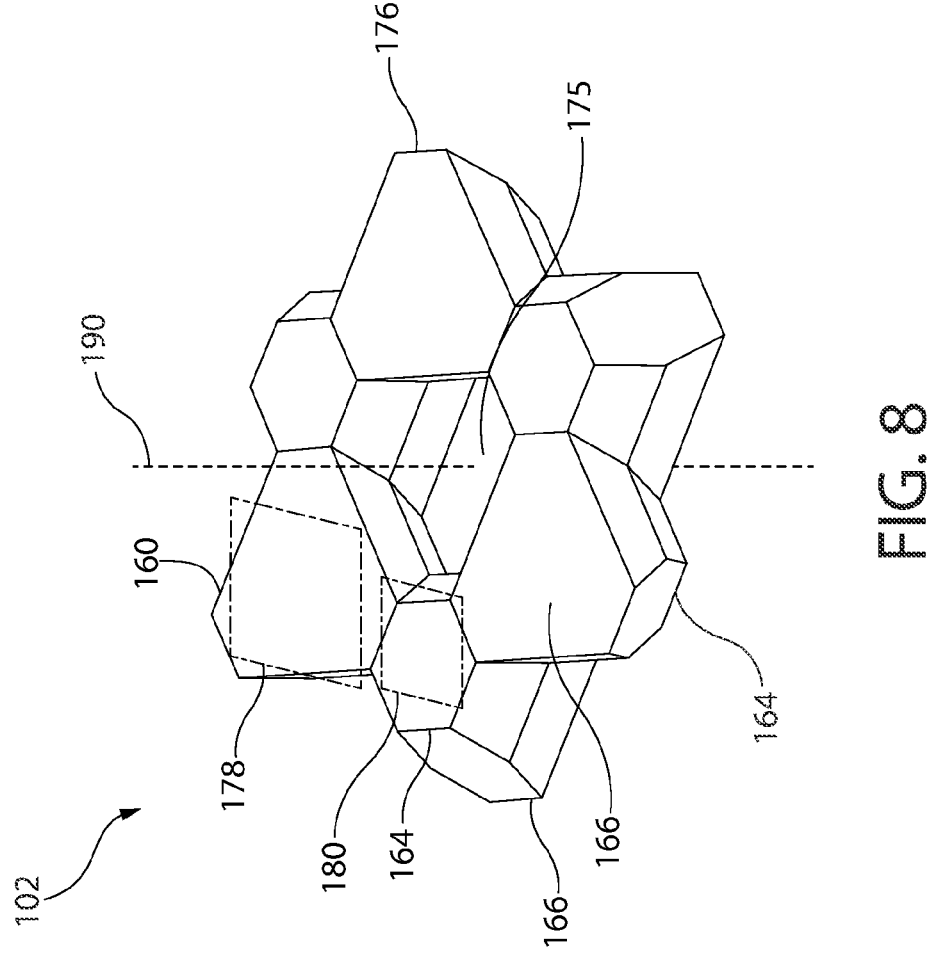
FIG. 8 is an arrangement of unit cells having a frustum geometry in accordance with an exemplary embodiment of the present invention.
Figures 9A, 9B:
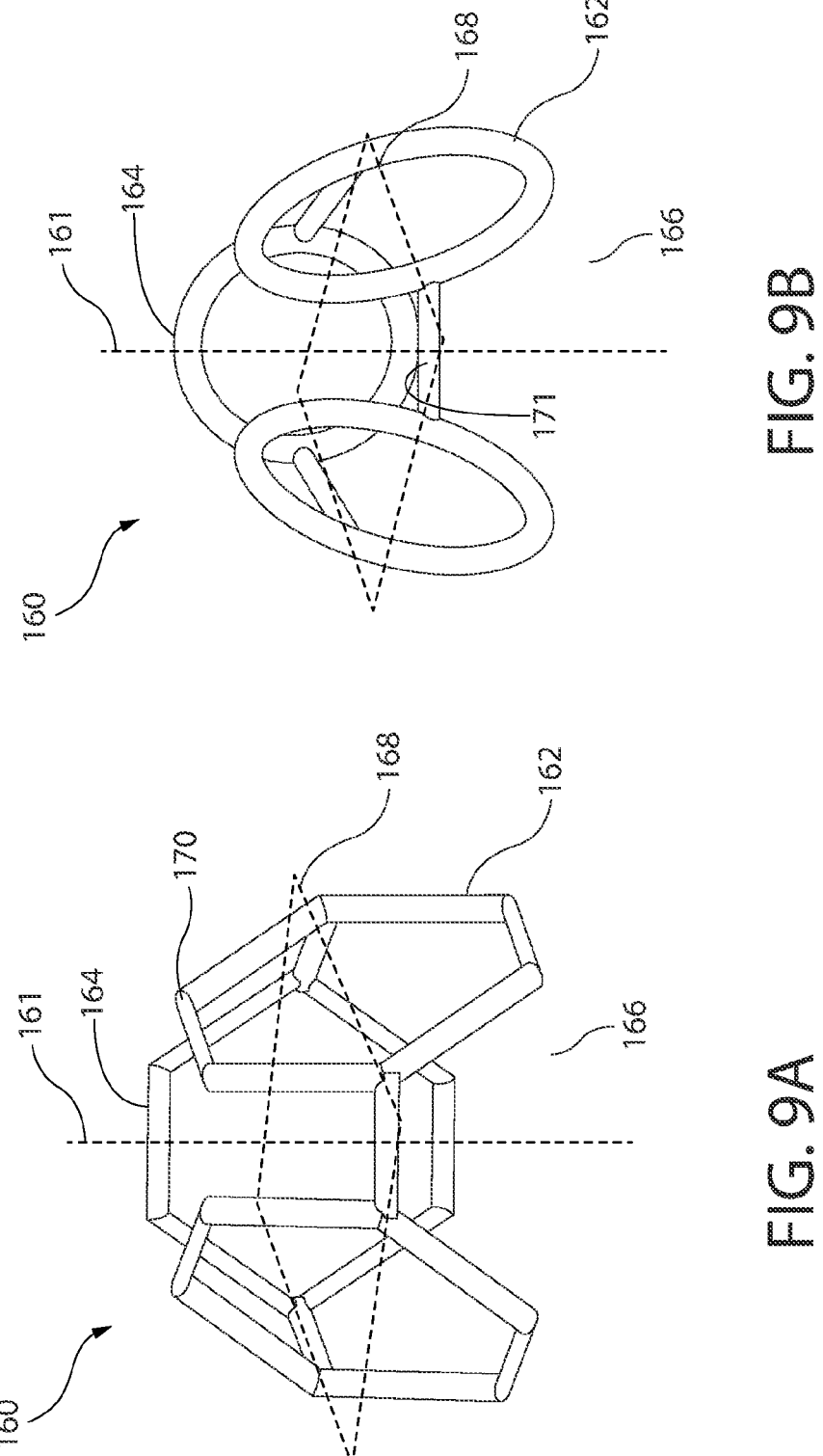
FIGS. 9A-9F are unit cells in accordance with exemplary embodiments of the present invention.
Figures 9C, 9D:
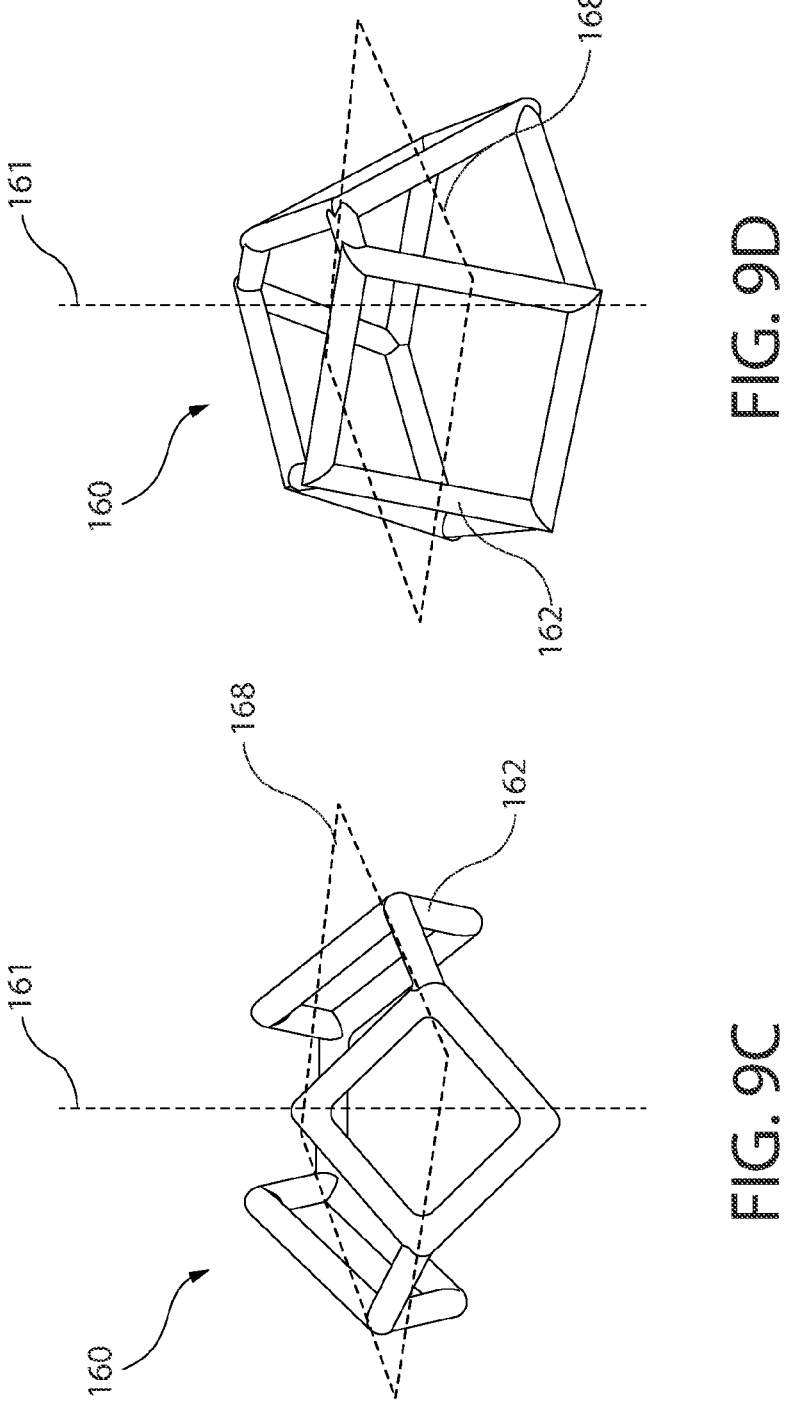
Figures 9E, 9F:
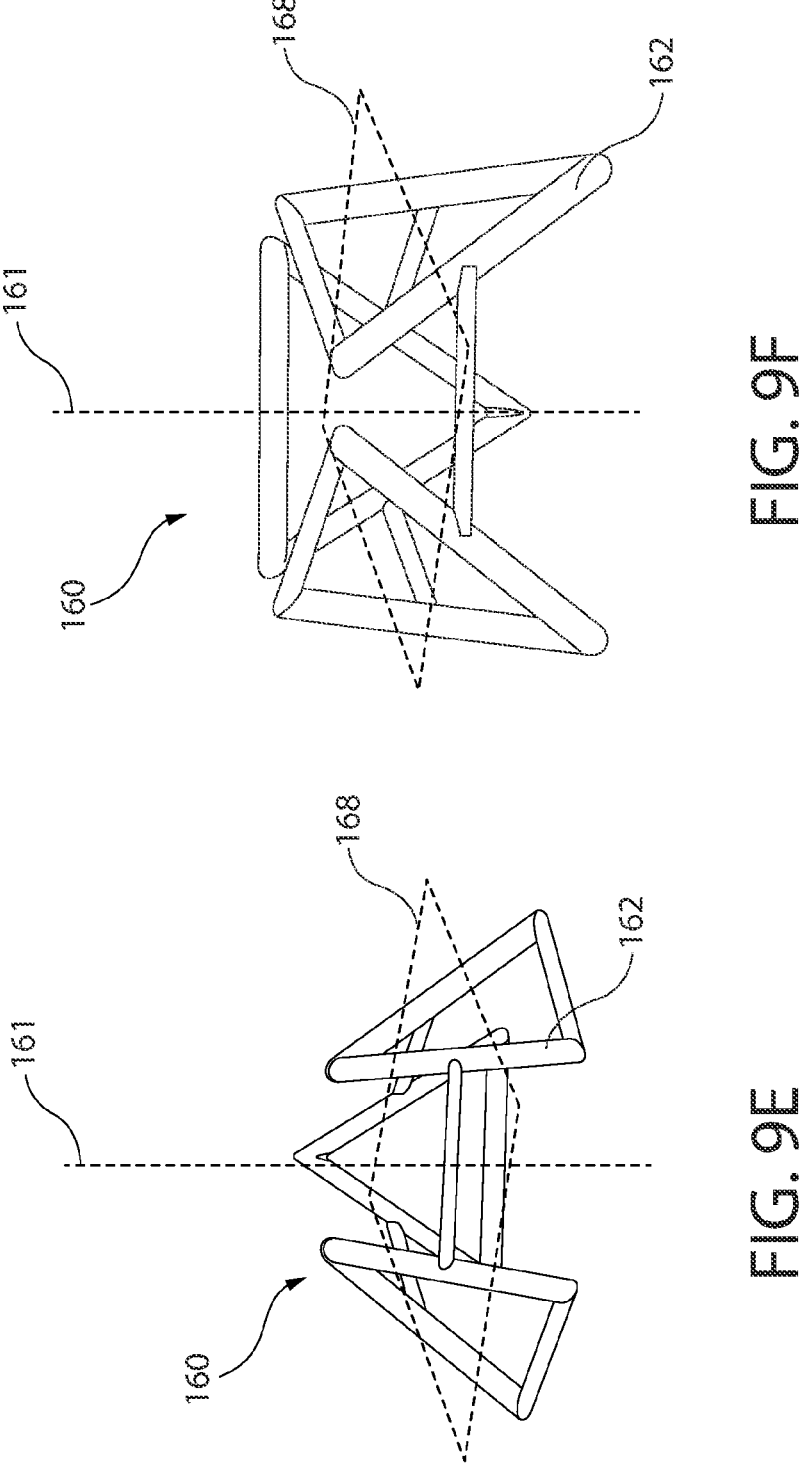

Referring to FIGS. 8-9F, lattice structure 102 may include a plurality of unit cells or cells 160 having a geometry or shape resembling a frustum. Unit cells 160 may include first end 164 and second end 166. In some embodiments, first end 164 may include first plane 178 extending through first end 164, which may be parallel to second plane 180 plane extending through second end 166.

Each unit cell 160 may include central axis 161 and horizontal plane 168. In some embodiments, each central axis 161 is perpendicular to horizontal plane 168. In some embodiments, plurality of unit cells 160 are coupled to one another to form lattice structure 102. For example, one unit cell of plurality of unit cells 160 may share sidewall frame 162 with another unit cell of plurality of unit cells 160, which may be adjacent to one unit cell. In some embodiments, each unit cell 160 shares one or more sidewall frames 162 with an adjacent unit cell 160. For example, each unit cell 160 may share three sidewall frame 162 with an adjacent unit cell 160. However, each unit cell 160 may share one, two, four, five, six, seven, eight, nine, or ten sidewall frames 162 with an adjacent unit cell 160. In some embodiments, adjacent unit cells 160 are in an inverted position about horizontal plane 168 compared to other unit cells 160.

Referring to FIGS. 9A-9F, unit cells 160 may include a plurality of sidewall frames 162. Each unit cell 160 may include at least three sidewall frames 162. However, each unit cell 160 may include four, five, six, seven, eight, nine, or ten sidewall frames 162. In some embodiments, the number of sidewall frames 162 of unit cell 160 is dependent on the base geometry of unit cell 160. For example, unit cell 160 may have a base geometry resembling an octagonal frustum and may include four sidewall frames. However, unit cell 160 may have any base geometry desired and any number of sidewall frames 162. Plurality of sidewall frames 162 may be disposed at an angle relative to central axis 161 of cell 160. For example, sidewall frames 162 may be disposed at a slanted angle relative to central axis 161 such that second end 166 of cell 160 is wider than first end 164. However, unit cells 160 may be disposed at a slanted angle such that first end 164 is further away from central axis 161 than second end 166. In some embodiments, unit cell 160 includes plurality of sidewall frames 162 arranged such that one sidewall frame 162 is adjacent to another sidewall frame 162 without horizontal overlap between the one and the other sidewall frames 162. Each sidewall frame 162 may be coupled to an adjacent sidewall frame 162 by one or more spacing struts 171. In some embodiments, spacing strut 171 is disposed along horizontal plane 168. In some embodiments, unit cell 160 is coupled to an adjacent unit cell 160 via sidewall frame 162. For example, sidewall frame 162 of one unit cell 160 may be coupled to sidewall frame 162 of an adjacent unit cell 160. In some embodiments, the length of spacing strut 171 is adjusted to change the stiffness of unit cell 160.

Figure 10:
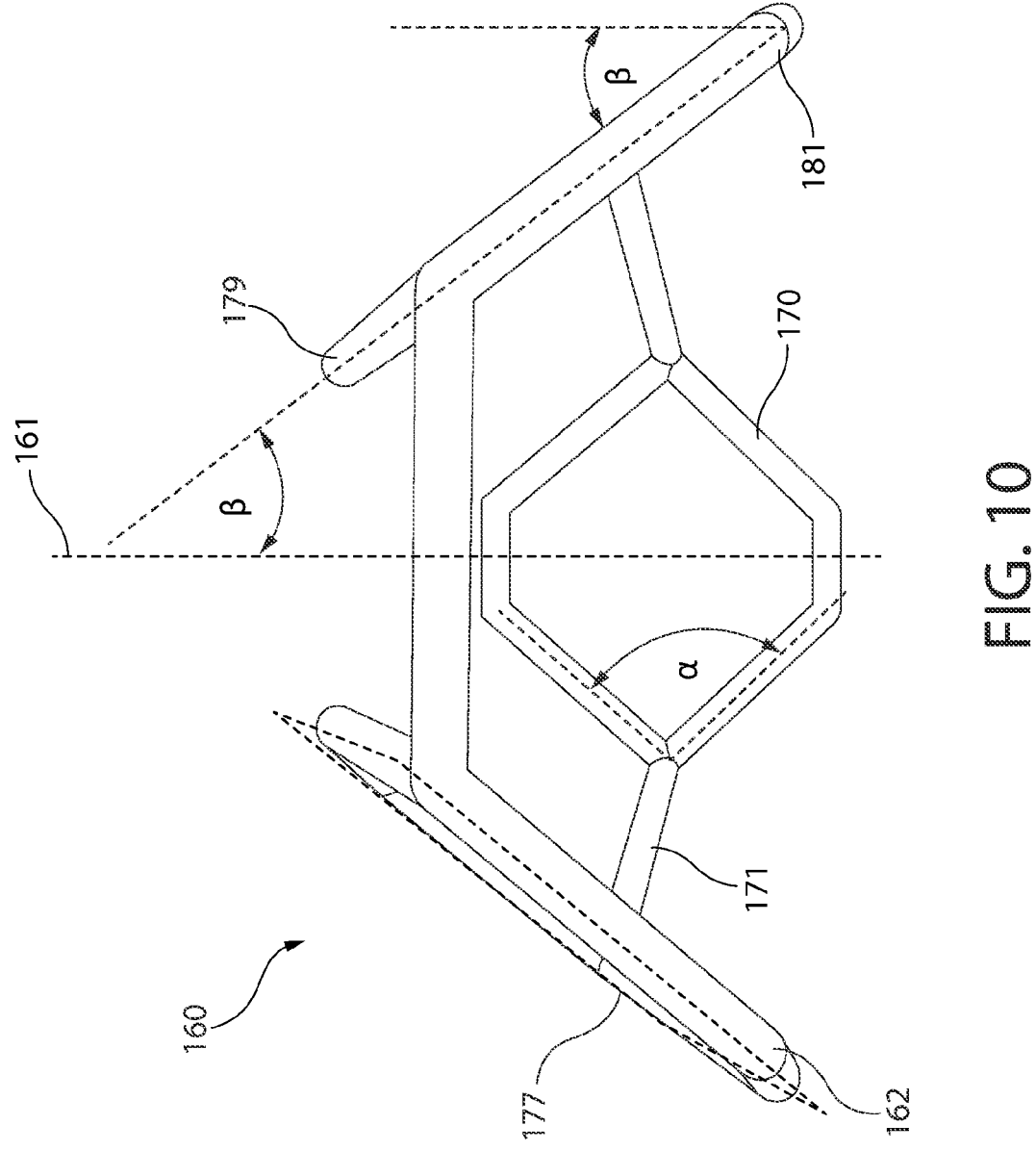
FIG. 10 is the cell of FIG. 9A showing an internal angle and a slant angle in accordance with an exemplary embodiment of the present invention.

Referring to FIG. 10, sidewall frames 162 may be comprised of plurality of struts 170 that are coupled together in an end-to-end configuration to form each sidewall frame 162. In some embodiments, plurality of struts 170 form sidewall frame 162 such that sidewall frame 162 resembles a geometric shape. The geometric shape may be disposed on plane 177 and may include no cross members or struts 170 that are not along the perimeter of the geometric shape. In some embodiments, the geometric shape of sidewall frame 162 is a closed shape. For example, each sidewall frame 162 may be comprised of plurality of struts 170 such that each sidewall frame 162 is a closed shape.

In some embodiments, sidewall frames 162 is sized and shaped such that each sidewall frame 162 is symmetrical about horizontal plane 168. For example, each sidewall frame 162 may be a hexagonal, circular, elliptical, oval, diamond (FIG. 9C), square (FIG. 9D), rectangular, octagonal, bowtie, or any other shape that is symmetrical about horizontal plane 168. However, sidewall frame 162 may be sized and shape such that sidewall frame 162 is not symmetrical about horizontal plane 168. For example, sidewall frame 162 may be a triangle (FIG. 9E), inverted triangle (FIG. 9F), pentagon, trapezoid, or any other shape desired. In some embodiments, sidewall frame 162 includes plane 177, top 179, and bottom 181. In some embodiments, top 179 may be disposed closer to horizontal plane 168 than bottom 181.

In some embodiments, sidewall frames 162 being at an angle allows for high compression strain, which prevents struts 170 from collapsing onto one another. In some embodiments, unit cells 160 are compressible such that unit cells 160 deform under impact. For example, unit cells 160 may comprise lattice structure 102 and may be configured such they are compressible without struts 170 overlapping.

Unit cells 160 of lattice structure 102 may be configured to attenuate impact in applications such as helmets. However, unit cells 160 may be used in lattice structure 102 to attenuate impact for applications in shoes, automobiles, transportation, dental, medical devices, sporting goods, industrial and manufacturing equipment, packaging, playground equipment, or any other application that requires impact attenuation.

Figure 11A:
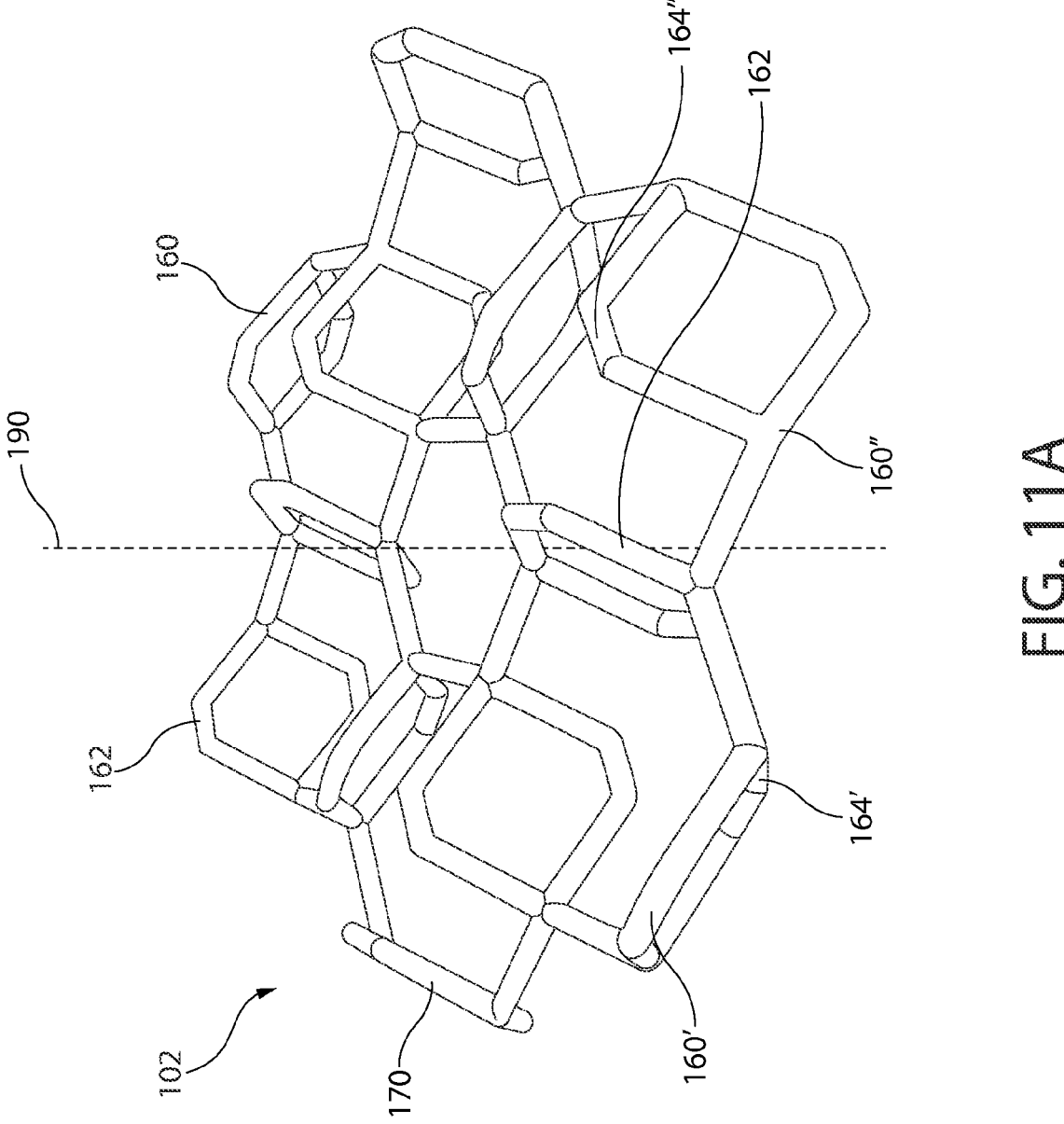
FIGS. 11A-11E are illustrations of exemplary embodiments of a plurality of unit cells in a lattice configuration.
Figure 11B:
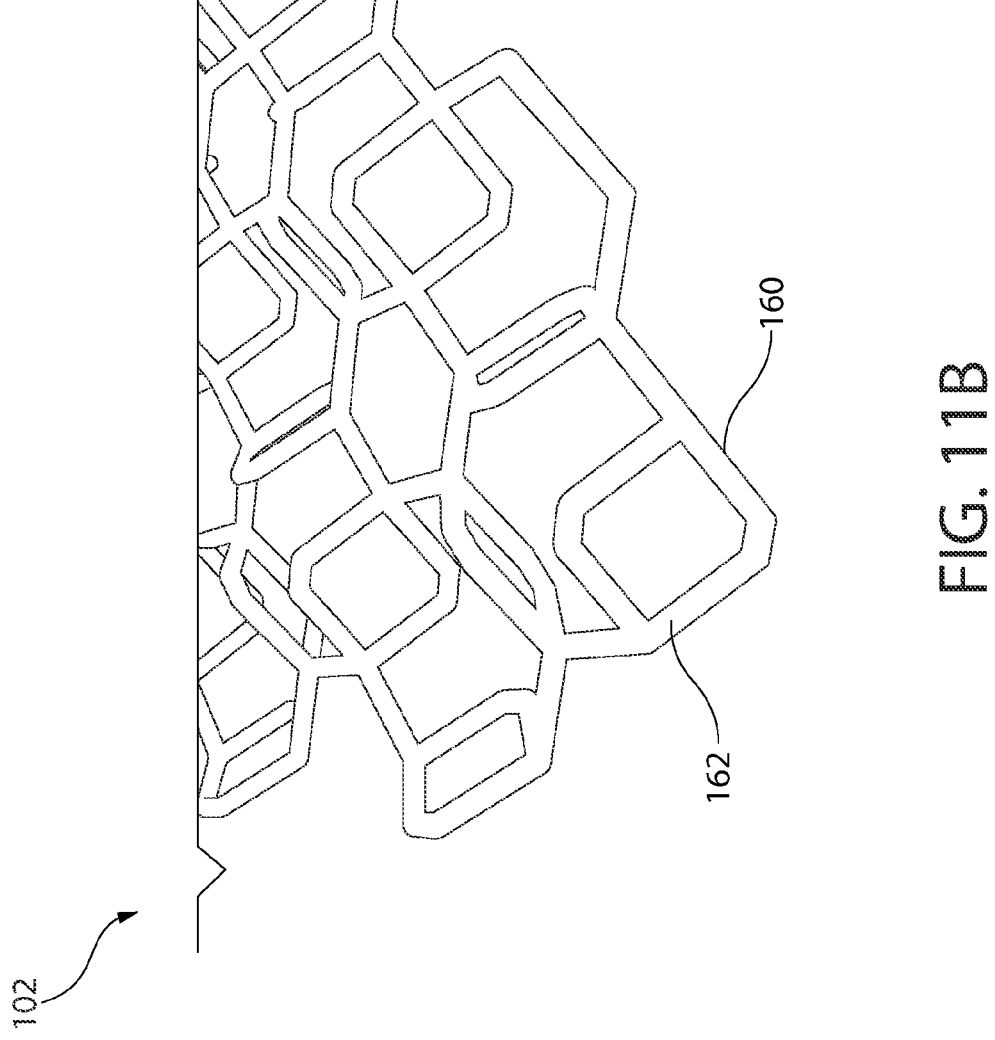
Figure 11C:
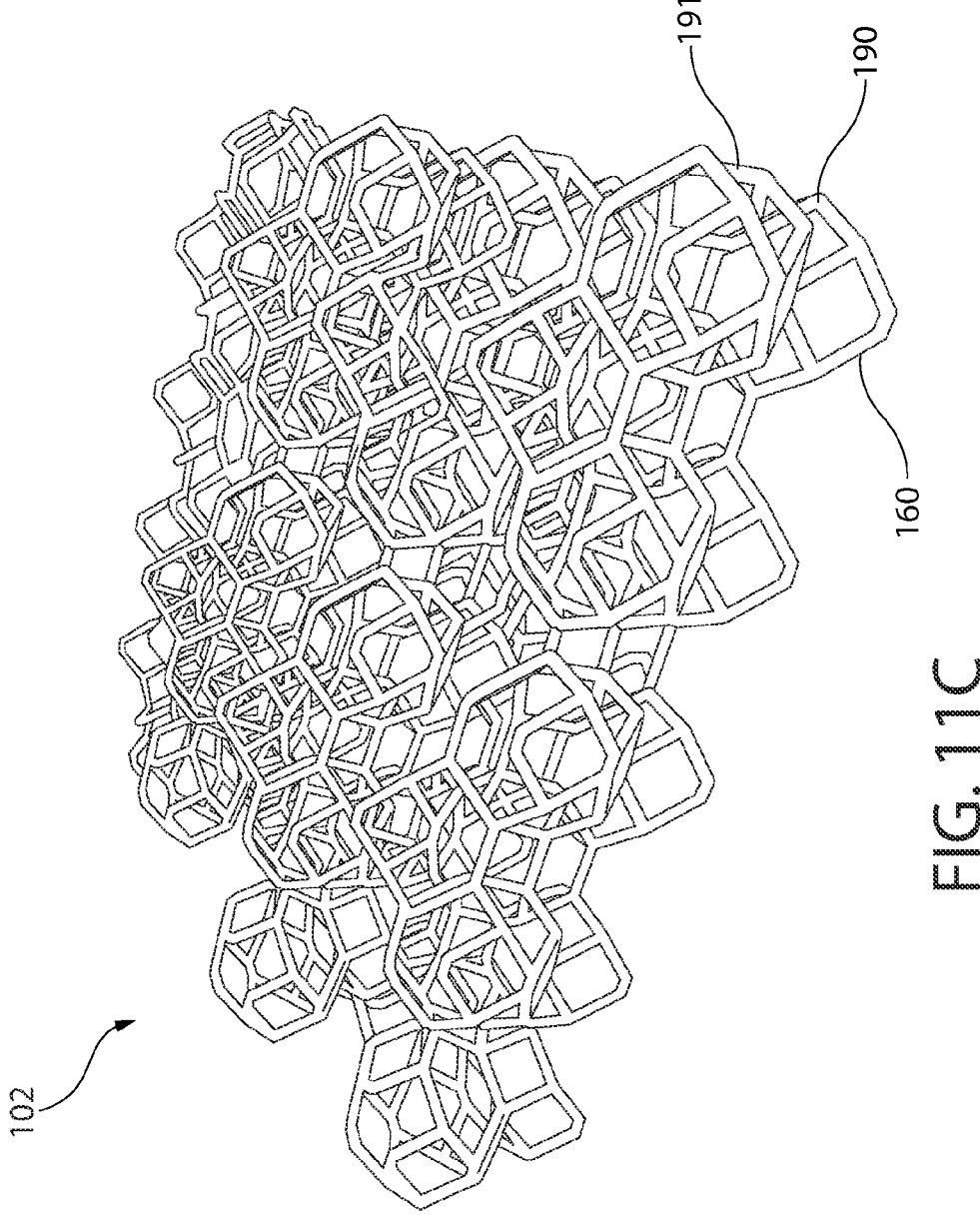
Figure 11D:
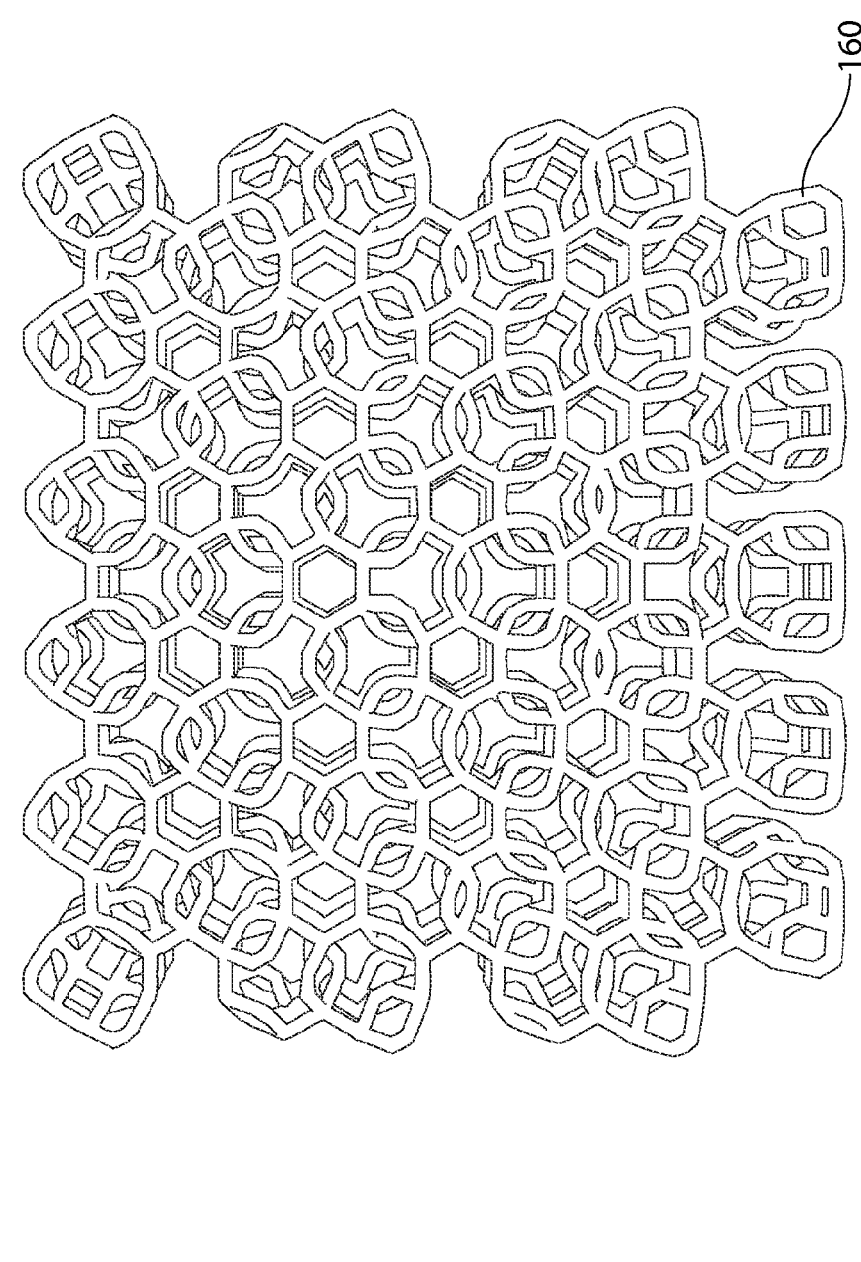
Figure 11E:
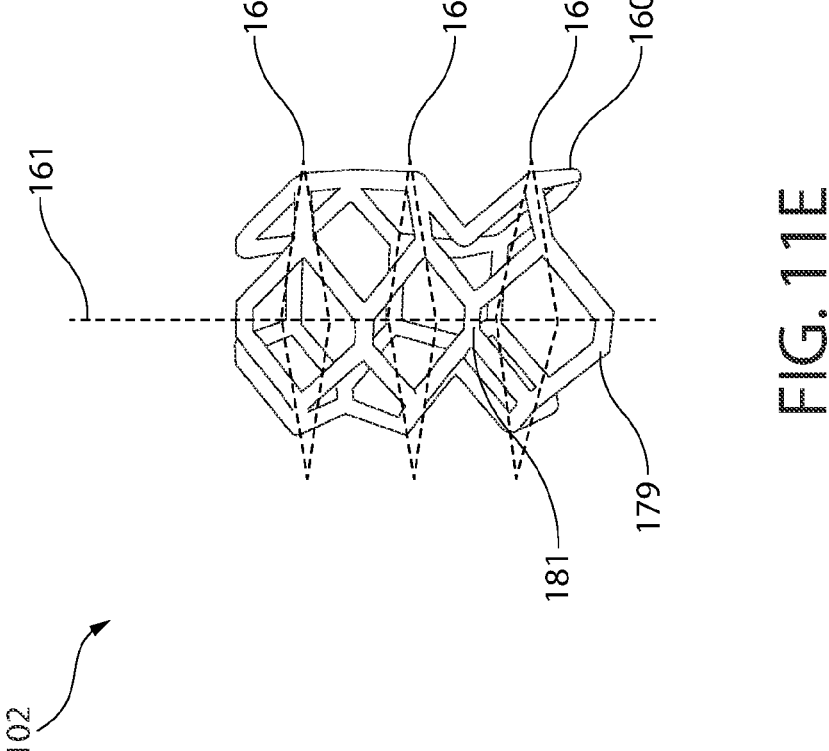

Referring to FIGS. 10-11E, unit cells 160 may be arranged in a tessellated configuration. Lattice structure 102 may be comprised of tessellated unit cells 160 disposed around central column or axis 190. For example, unit cells 160 may resemble a polygonal frustum array as shown in FIG. 10. In some embodiments, lattice structure 102 may be devoid of central column 190. For example, lattice structure 102 may be comprised of unit cells 160 such that unit cells 160 are coupled together without forming central column 190. In some embodiments, sidewall frame 162 is hexagonal or other polygonal that allows for tessellation of unit cells 160 thereby maximizing the fill volumes between unit cells 160. Lattice structure 102 may have unit cells 160 arranged such that adjacent unit cells 160 are inversely disposed about their horizontal axis. In one embodiment, unit cells 160 are disposed between adjacent unit cells 160 such that first end 164 of unit cells 160 are between and adjacent to second end 166 of adjacent unit cells 160. For example, as illustrated in FIGS. 11C and 11D, lattice structure 102 may be formed by plurality of unit cells 160 arranged such that horizontally adjacent unit cells 160 are positioned inversely about horizontal plane 168 relative to each other. In some embodiments, such as FIG. 11E, lattice structure 102 is formed by plurality of unit cells 160 arranged such that vertically adjacent unit cells 160 are positioned inversely about horizontal plane 168 relative to each other. Unit cells 160 may be arranged to adjacent unit cells 160 such that there is no horizontal overlap of sidewall frames 162 between unit cells In some embodiments, lattice structure 102 is comprised of multiple layers of lattice structure 102. For example, multiple lattice structures 102 may be arranged such that at least two lattice structures 102 are stacked vertically. For example, one lattice structure 102 may be vertically adjacent to another lattice structure 102. In some embodiments, sidewall frame 162 of one unit cell 160 may contact sidewall frame 162 of a vertically adjacent unit cell 160 when a force is applied to lattice structure 102.

Referring to FIG. 8, lattice structure 102 may include a layers of unit cells 160 disposed in a 3×3 configuration disposed about central column 190. For example, first layer 174 may be comprised of three unit cells 160 and second layer 176 may be comprised of a different set of three unit cells 160. In some embodiments, lattice structure 102 is formed by at least six unit cells 160 disposed about central column 190 arranged such that horizontally adjacent unit cells 160 are positioned inversely about horizontal plane 168 relative to each other. Second layer 176 may be arranged such that unit cells 160 of second layer 176 are disposed between unit cells 160 of first layer 174. In some embodiments, center space 175 of the 3×3 configuration is empty and devoid of any unit cells 160 or other material/components. In alternate embodiments, center space 175 includes one or more unit cells 160 of different shapes, struts 170, or any other structure desired.

In some embodiments, first end 164 includes first plane 178 extending through first end 164 and second end 166 includes second plane 180 extending through second end 166. First plane 178 of cell 160 may be parallel to second plane 180 of the same cell 160. In some embodiments, first plane 178 of one cell 160 is spaced apart and parallel to first plane 178 of an adjacent cell. In some embodiments, first plane 178 of one cell 160 is substantially co-planar with second plane 180 of an adjacent cell 160. In some embodiments, lattice structure 102 is comprised of unit cells 160 in a 3×3 configuration such that all first plane 178 of unit cells 160 in first layer 174 are spaced apart and parallel to first plane 178 of unit cells in second layer 176.

Referring to FIG. 10, sidewall frames 162 may be hexagonal in shape and may include internal angle α. Internal angle α may be the angle between two struts 170 of sidewall frame 162. In one embodiment, internal angle α is between two struts 170 of one sidewall frame 162 adjacent to spacing strut 171, which connects one sidewall frame 162 to another sidewall frame 162. In some embodiments, internal angle α is from approximately 0° to 300°. For example, internal angle α may be from 45° to 300°, 90° to 270°, or 135° to 225°. In some embodiments, internal angle α is approximately 120° when sidewall frame 162 is hexagonal or approximately 90° when sidewall frame 162 is diamond shaped. In some embodiments, internal angle α is from 60° to 280°. Unit cells 160 may also include slant angle β, which may be the angle at which sidewall frame 162 is slanted relative to central axis 161. Slant angle β may allow sidewall frames 162 to be angled so that struts 170 do not contact one another during high compressive strains thereby increasing the strain at which densification onset occurs. Slant angle β may also have the additional effect of changing the stiffness of cell 160 by shifting the deformation mode from one of truss-like crushing when slant angle β is small to one of rotational crushing when slant angle β is larger. In some embodiments, slant angle β is greater than 0°. In some embodiments, slant angle β is from approximately 0° to approximately 90°. In a preferred embodiment, slant angle β is from 15° to 60°. In some embodiments, slant angle β is greater than 0° and less than or equal to 30°.

Referring to FIGS. 11A-11E, lattice structure 102 may be comprised of a plurality of unit cells 160 arranged in a tessellated configuration. Unit cells 160 may be arranged such that one cell 160 shares sidewall frame 162 with an adjacent cell 160 and first end 164 of one cell 160 may be adjacent to second end 166 of an adjacent cell 160. For example, cell 160' may include slanted sidewall frame 162, which may be sidewall frame 162 of adjacent cell 160". Further, first end 164' of cell 160' may be opposite and parallel to first end 164" of adjacent cell 160".

In some embodiments, lattice structure 102 may be configured to bend and flex such that lattice structure 102 can conform to different concavities. For example, the lengths of struts 170 and spacing struts 171 may be adjusted to allow for lattice structure 102 to curve and warp to different concavities. Unit cells 160 may include an interior devoid of struts 170 or structures. In some embodiments, unit cells 160 of lattice structure 102 is configured to compress such that struts 170 do not overlap when unit cells 160 are in a compressed state. For example, when unit cells 160 are substantially compressed, unit cells 160 may be substantially flat and first plane 178 of unit cells 160 may be substantially co-planar with second plane 180 of unit cells 160. This configuration, along with the interior of unit cells 160 being devoid of structure or struts 170, allows for unit cells 160 to be compressed and flattened without resulting in stacking of struts 170 of unit cells 160 thereby providing greater impact attenuation.

Referring to FIGS. 11C-11E, lattice structure 102 may include multiple layers, with each layer being comprised of a plurality of unit cells 160. For example, lattice structure

102 may include first layer 191 and second layer 192, each comprised of a plurality of unit cells 160. However, lattice structure 102 may include any number of layers. For example, lattice structure 102 may include between one and 100 layers of unit cells 160 arranged in a tessellated configuration. However, lattice structure 102 may be comprised of any number of unit cells 160 and any number of layers arranged in a tessellated configuration. In some embodiments, lattice structure 102 is comprised of one or more layers of unit cells 160 arranged in an alternating configuration such that adjacent unit cells 160 are positioned inversely relative to horizontal plane 168. In some embodiments, multiple layers of lattice structure 102 are stacked and positioned such that each lattice structure 102 is aligned when viewed from above. Lattice structure 102 may be comprised of a plurality of unit cells 160 stacked such that top 179 of one unit cell 160 comprises bottom 181 of a vertically adjacent unit cell 160. In some embodiments, lattice structure 102 is comprised of a plurality of unit cells 160 vertically stacked about central axis 161. In some embodiments, a plurality of unit cells 160 are vertically stacked such that horizontal plane 168 of one unit cell 160 is parallel to horizontal plane 168 of a vertically adjacent unit cell 160. In some embodiments, lattice structure 102 is comprised of a plurality of unit cells 160 such that central axis 161 of one unit cell 160 is parallel to central axis 161 of an adjacent unit cell 160.

In some embodiments, impact attenuation liner system 100 may include more than one type of lattice structure 102. For example, impact attenuation liner system 100 may include a liner comprised of a plurality of lattice structures 102 arranged in different in configurations. Impact attenuation liner system 100 may include one or more lattice structures 102, where one portion of liner includes lattice structures 102 comprised of cells 104 and another portion of liner includes lattice structures 102 comprised of cells 160. In some embodiments, one portion of liner is comprised of cells 104 in a stackable configuration and another portion of liner is comprised of cells 160 in a non-stackable configuration to allow for different impact attenuation in different areas of liner and impact attenuation liner system 100. One portion of liner may be comprised of cells 104 or 160 having certain stiffness and another portion of liner may be comprised of cells 104 or 160 having a different stiffness to allow for different impact attenuation in different areas of liner and impact attenuation liner system 100. One portion of liner may also be comprised of cells 104 or 160 being one material and another portion of liner may be comprised of cells 104 or 160 being another material to allow for different impact attenuation in different areas of liner and impact attenuation liner system 100.

Figure 12A:
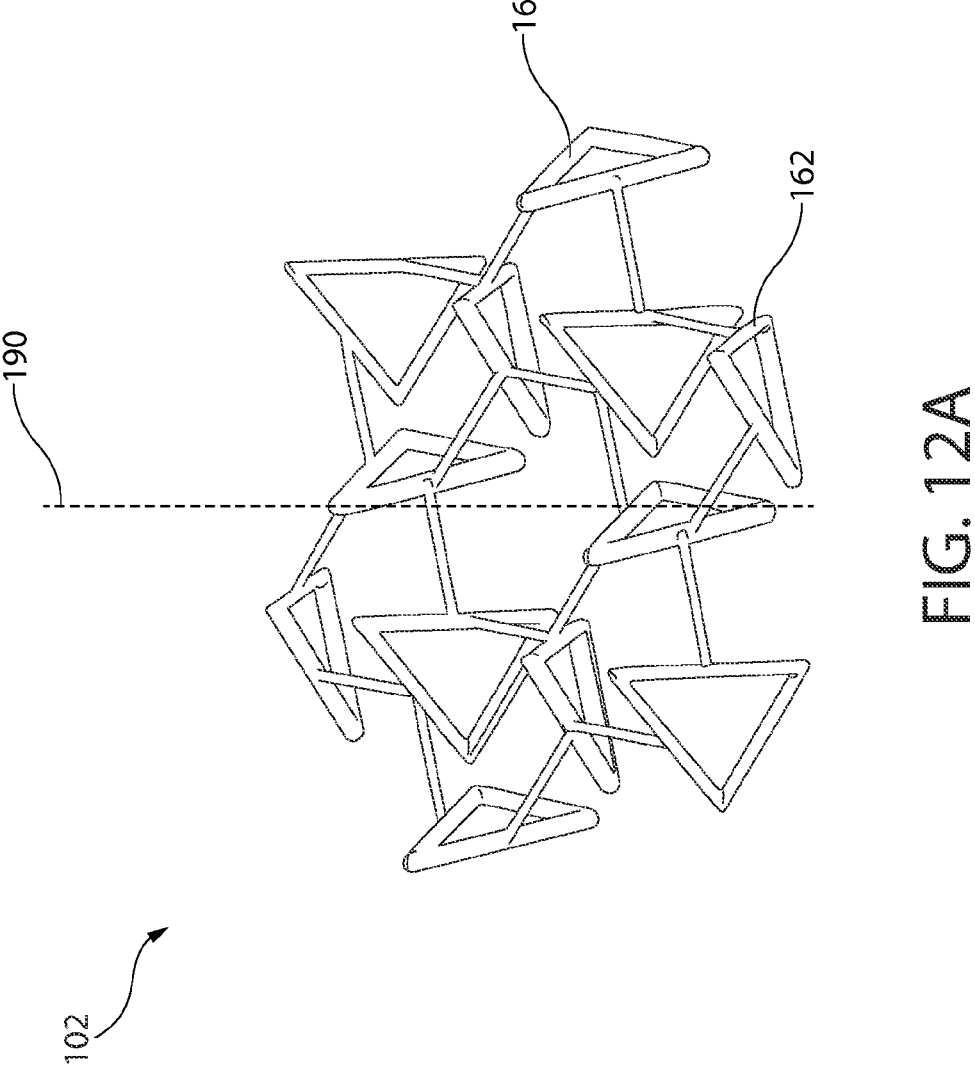
FIGS. 12A-12B are illustrations of exemplary embodiments of a plurality of unit cells in a lattice configuration.
Figure 12B:
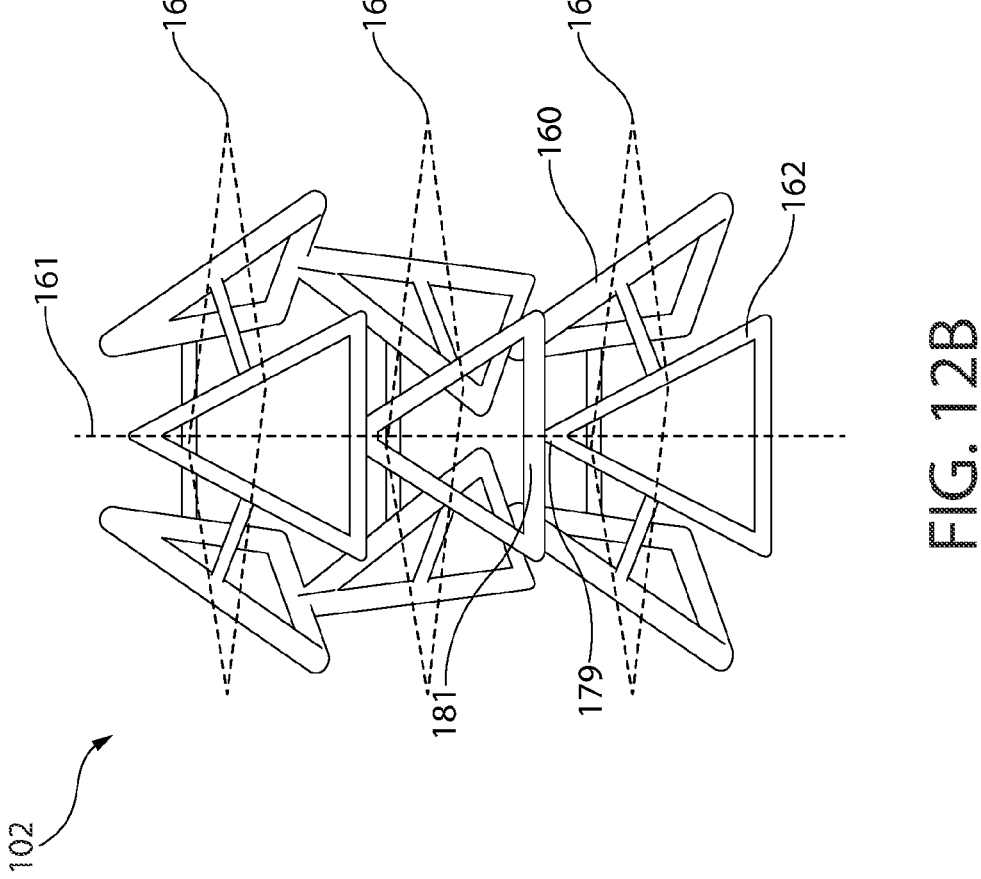

Referring to FIGS. 12A-12B, unit cells 160 may include a plurality of sidewall frames 162 of any shape and unit cells 160 may be tessellated and stacked to form lattice structure 102, similar to FIGS. 11B-11E. For example, unit cells 160 may be stacked such that top 179 of one unit cell 160 contacts or is coupled to bottom 181 of a vertically adjacent unit cell 160 (FIG. 12B).

In one embodiment, lattice structure 102 is configured to provide specific impact attenuation performances at specific locations. For example, lattice structure 102 may be configured to match specific performance characteristics in front region 108 and different performance characteristics in back region 110. In another example, lattice structure 102 may be configured to provide greater or lesser impact attenuation at the crown or front of the head versus the left and right sides. Lattice structure 102 may include specific regions which may be configured to crush upon impact. For example, lattice structure 102 may have regions strategically placed throughout lattice structure 102 which may be configured to initiate crushing in order to control the transfer of impact energy on a first and/or second impact event. In one embodiment, lattice structure 102 may allow for the interchangeability of the strategically placed regions by the user in the field based on situation specific performance characteristics. For example, situation specific uses of impact attenuation liner system 100 may require increase or decrease of the thickness of struts 106 of lattice structure 102 to allow for varying impact attenuation.

In some embodiments, different levels of impact attenuation can be achieved by having lattice structure 102 with different densities of the impact-absorbing material at the different locations. In some embodiments, lattice structure 102 may include denser material at locations where greater impact attenuation is desired. In other embodiments, lattice structure 102 may have a variable thickness, for example, such that lattice structure 102 is thicker at portions where greater impact attenuation is desired. In some embodiments, lattice structure 102 is lined with another material. For example, lattice structure 102 may be lined with a soft material to provide comfort to the user. In another example, lattice structure 102 may be lined with a hard material to provide more protection and impact attenuation to the user.

In one embodiment, additively manufactured auxetic structures may be created within lattice structure 102 to increase specific energy absorption in localized areas. For example, cells 104 and 160 may be arranged, via additive manufacturing, in an auxetic geometry throughout specific regions of lattice structure 102 to increase energy absorption in those specific regions. The term "auxetic" as used herein generally refers to a material or structure that has a negative Poisson's ratio. As such, when stretched, auxetic materials become thicker (as opposed to thinner) in a direction perpendicular to the applied force. Likewise, when compressed (e.g., by a blunt impact), auxetic materials become thinner in a direction traverse to the applied force. This contraction of the material acts to draw material in from outside of the impact zone to add supplemental energy absorption. This occurs due to the hinge-like structures (sometimes called a "re-entrant" structure) that form within auxetic materials. Most materials, including conventional foams (e.g., expanded polypropylene (EPP)), typically have positive Poisson's ratio, meaning that the materials tend to expand in a direction perpendicular to the direction of compression. Conversely, when a conventional material is stretched, it tends to contract in a direction transverse to the direction of stretching. A rubber band is a good example of an article with a positive Poisson's ratio, in that when stretched, the rubber band becomes thinner.

Figure 13:
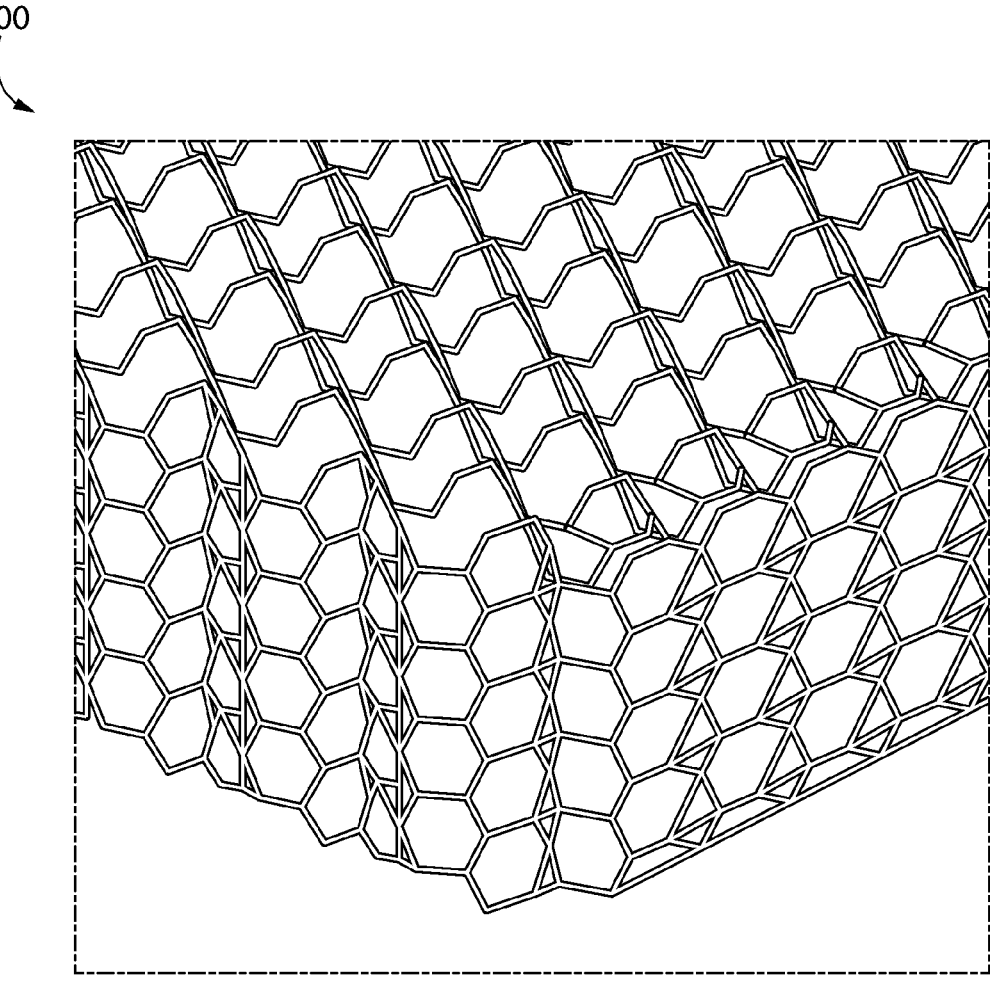
FIG. 13 is an exemplary additively manufactured lattice composed of macro scale cross-linked (3,3) carbon nanotubes.
Figure 14:
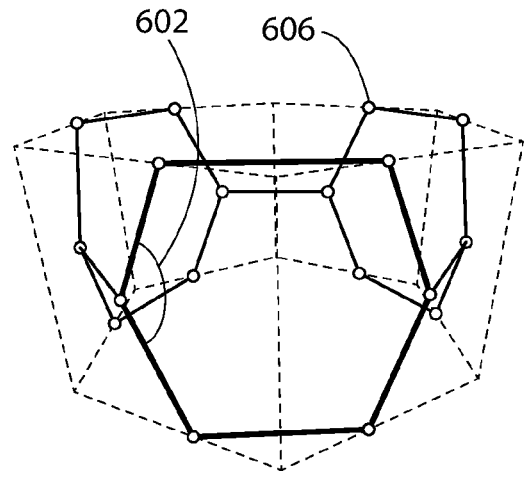
FIG. 14 is an exemplary unit cell geometry of cross-linked (3,3) carbon nanotubes.
Figure 15:
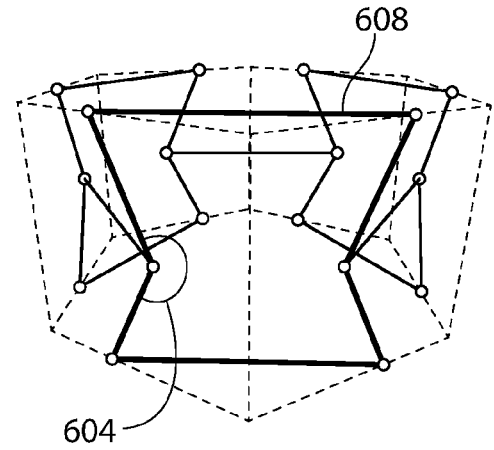
FIG. 15 is an exemplary cell geometry of auxetic cross-linked (3,3) carbon nanotubes.

Referring to FIG. 15, auxetic cells 104 may be used to create lattice structure 102. In some embodiments, additively manufactured macro scale cross-linked carbon nanotubes (MSCLCNTs) 800 are used to create lattice structure 102, such as illustrated in FIG. 13. MSCLCNTs may be comprised of auxetic cells 104 such as those in FIG. 15. In some embodiments, MSCLCNTs may be modelled after a superposition-based cross-linking of (3,3) carbon nanotubes. In some embodiments, MSCLCNTs may be an auxetic variant of a superposition-based cross-linking of (3,3) carbon nanotubes. MSCLCNTs may be cross-linked to form a continuous orthotropic material and may be modelled after various permutations achieved by rolling a graphene sheet. In some embodiments, the continuous orthotropic material may have different configurations. For example, at least eight distinct configurations may be created based upon graphene sheets rolled to form CNTs in various rotational orientations and the cross-linking strategy used to combine the CNTs. These discreet configurations may also vary based on the bonding behavior of carbon atoms of the CNTs and the macro scale counterparts can additionally be formed in configurations that are not found in these discreet configurations of atomic scale CNTs. In some embodiments, lattice structure 102 may be produced by additively manufacturing a macroscopic analog of atomic structure of the CNTs. The MSCLCNT structures may provide for low velocity impact attenuation.

Figures 16A, 16B, 17A, 17B:
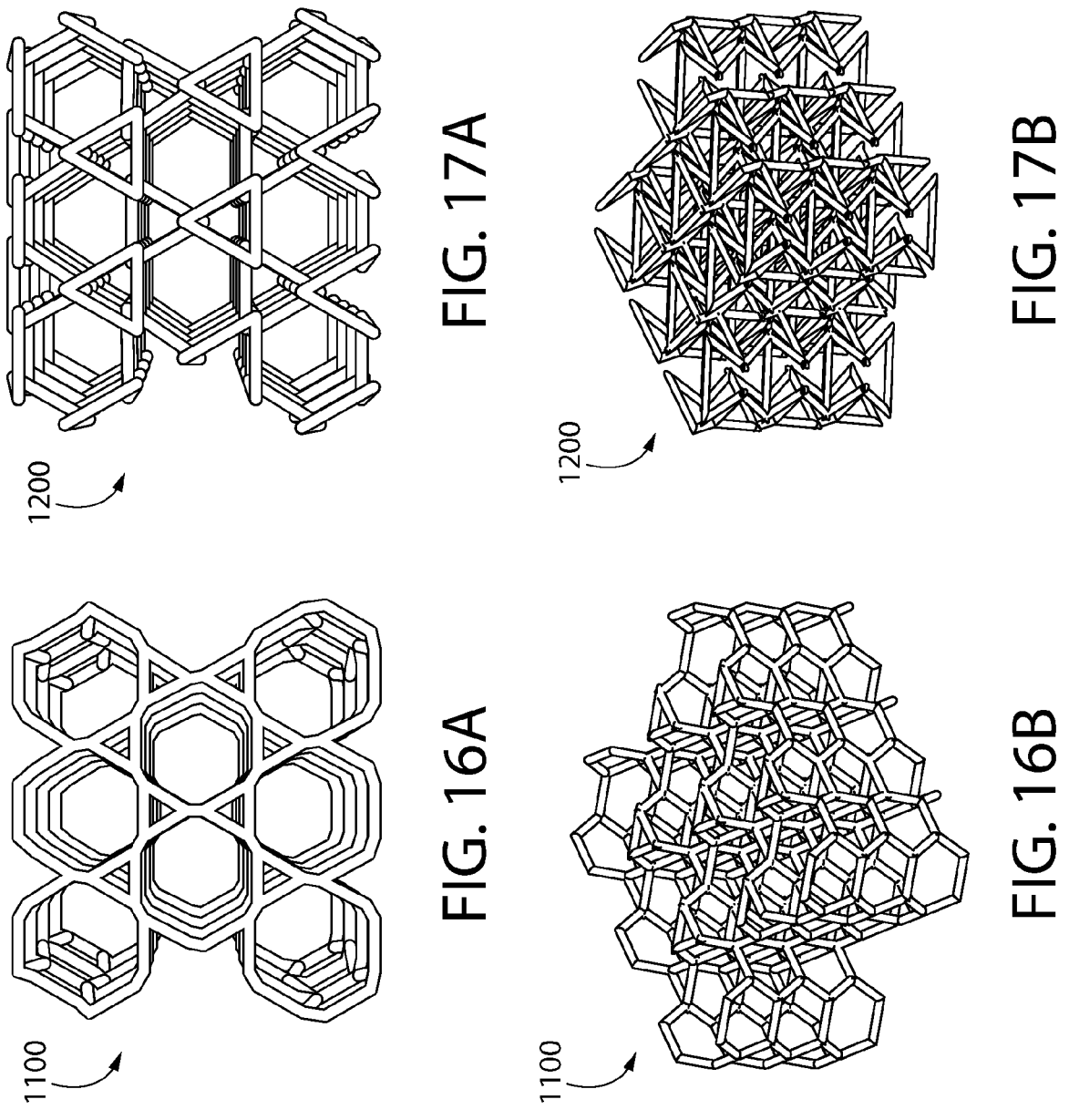
FIG. 16A is a top view of a lattice composed of cross-linked (3,3) carbon nanotubes.
FIG. 16B is an isometric view of the lattice of FIG. 16A.
FIG. 17A is a top view of a lattice composed of auxetic cross-linked (3,3) carbon nanotubes.
FIG. 17B is an isometric view of the lattice of FIG. 17A.

Referring to FIGS. 14-17B, cell 104 may be created similarly to atomic scale CNTs and may have a cell geometry following that of a superposition-based cross-linking of (3,3) carbon nanotube 1100 (FIGS. 14, 16A-16B) or novel auxetic variant of the macro scale superposition-based cross-linking of (3,3) carbon nanotube 1200 (FIGS. 15, 17A-17B). MSCLCNTs (FIG. 14) may have angle 602 and novel auxetic MSCLCNTs (FIG. 15) may have angle 604. Angle 602 may be greater than approximately 90° and angle 604 may be greater than approximately 180°. However, angle 602 may be from approximately 90° to approximately 180°, approximately 120° to approximately 160°, or approximately 140° to approximately 150°, and angle 604 may be from approximately 180° to approximately 360°, approximately 210° to approximately 330°, or approximately 240° to approximately 270°. The auxetic MSCLCNT of FIG. 15 may be created by changing angle 602 of the MSCLCNT of FIG. 14. The modification of angle 602 to angle 604 is significant as auxetic structures have been shown to outperform their standard counterparts in energy absorption due to their inherent structural behavior under loads that cause large deformations. The unit cell structures of both the MSCLCNT (FIG. 14) and the novel auxetic MSCLCNT (FIG. 15) may be contained within a hexagonal prism volume and may be comprised of 18 nodes 606 and 21 struts 608 connecting nodes 606. The unit cell structures of both the MSCLCNT (FIG. 14) and the novel auxetic MSCLCNT (FIG. 15) may contain redundant struts. In some embodiments, unit cell structures of both the MSCLCNT (FIG. 14) and the novel auxetic MSCLCNT (FIG. 15) are tessellated to fill a volume similar to a honeycomb with the MSCLCNT structure oriented such that energy is attenuated by compressing the MSCLCNT structures along their longitudinal axis. In the preferred embodiment, many of the MSCLCNT structures are packed to form a layer of tubes with the longitudinal axis oriented to be coincident with the loading axis.

Figure 18:
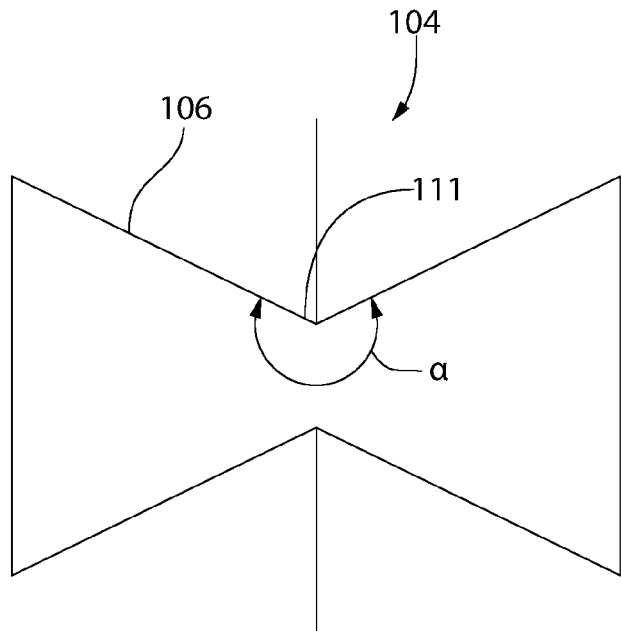
FIG. 18 is an illustration of a re-entrant angle in accordance with an exemplary embodiment of the present invention.
Figure 19:
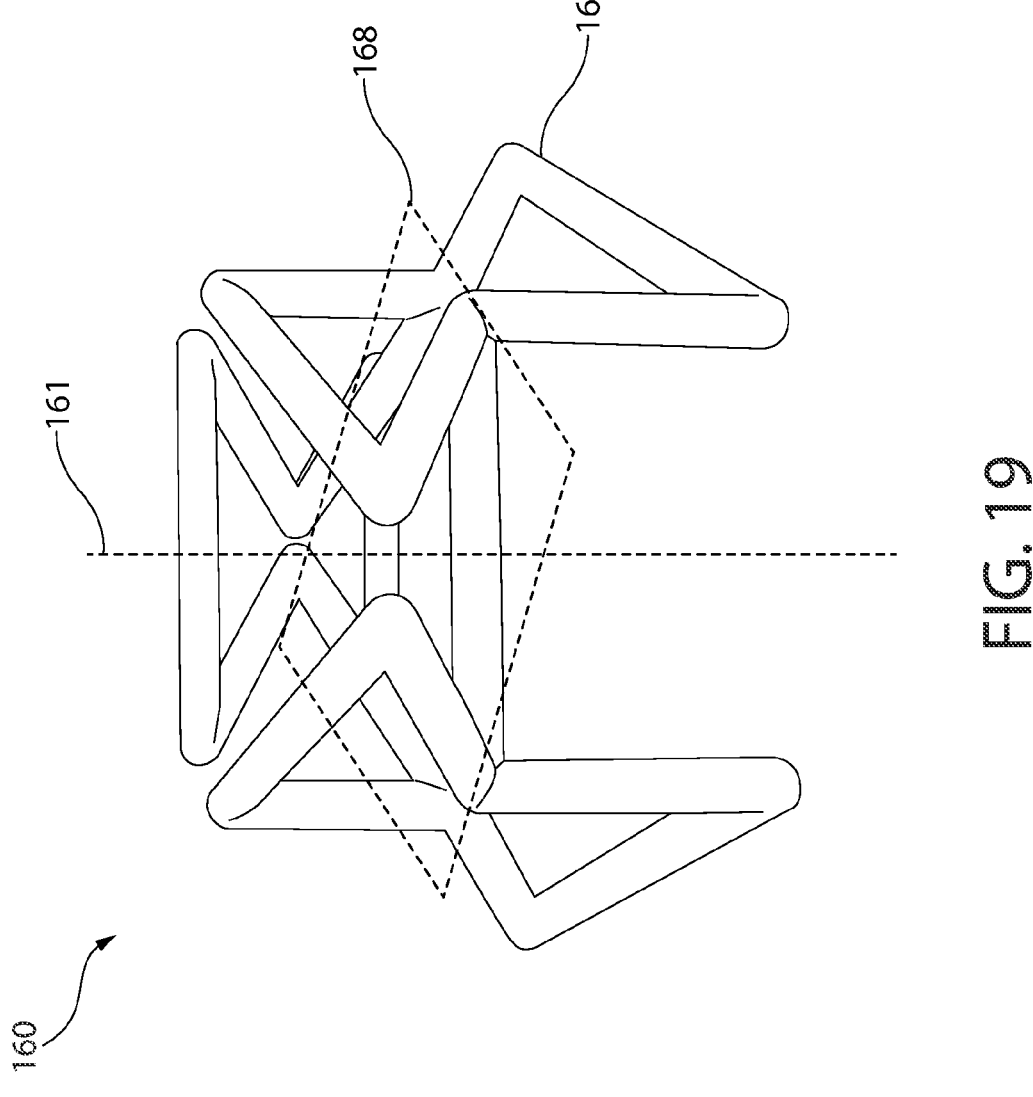
FIG. 19 is a cell with auxetic geometry in accordance with an exemplary embodiment of the present invention.

Referring to FIG. 18, cells 104 may have re-entrant angle α and struts 106. The re-entrant angle may be the angle at which struts 106 come together at node 111. In some embodiments, as the re-entrant angle decreases, the shape of cells 104 may resemble a rectangular shape. In some embodiments, as the re-entrant angle increases, the shape of cells 104 may resemble a bowtie shape. In one embodiment, cells 104 of lattice structure 102 may have auxetic geometries with re-entrant angles α ranging from approximately 180° to approximately 360°, approximately 210° to approximately 330°, or approximately 240° to approximately 300°. In some embodiments, the re-entrant angle is any angle that results in a lattice structure 102 having a negative Poisson's ratio Referring to FIG. 19, unit cells 160 may be configured to be in an auxetic geometry and may have a frustum geometry. For example, internal angle α may allow for sidewall frames 162 to be changed to an auxetic geometry when internal angle α is greater than 180° thereby increasing the stiffness and impact attenuation properties of cell 160. For example, internal angle α may be approximately 220° to promote auxetic behavior. However, internal angle α may be from 180° to 360° or from 225° to 315°.

Figures 20A, 20B, 20C:
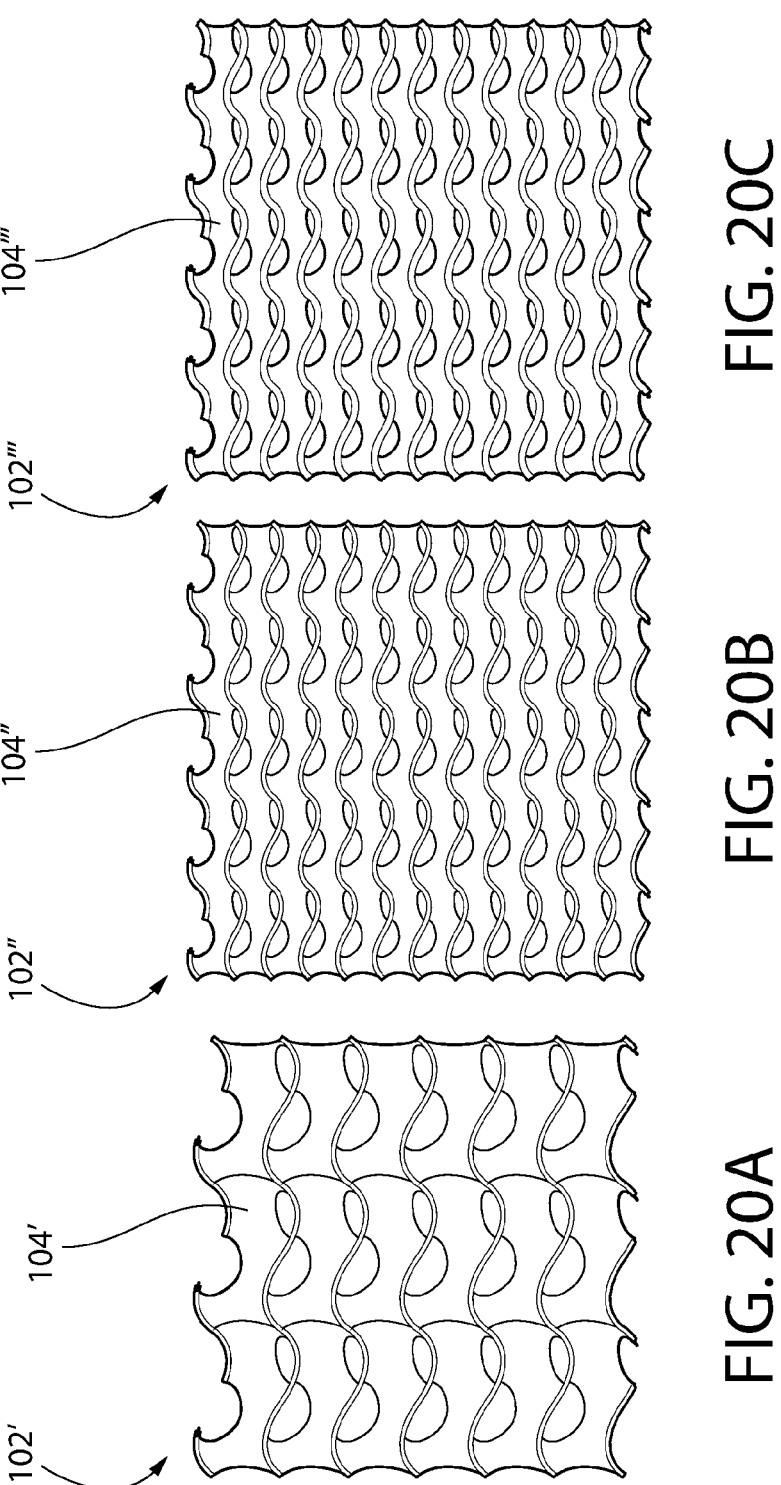
FIGS. 20A-20C illustrate top views of minimal surface lattice structures with varying cell size and wall thickness for use in the helmet impact attenuation liner in accordance with an exemplary embodiment of the present invention.

Referring to FIGS. 20A-20C, various configurations of cells 104 arranged in a minimal surface, often referred to as a gyroid geometry, are illustrated. In one embodiment, such as FIG. 4I, cells 104 may be configured in a gyroid geometry and may have faces 113 instead of struts 106. Specifically, FIGS. 20A-20C show lattice structure 102 with varying sizes of cells 104 and varying thicknesses of faces 113. FIG. 20A shows lattice structure 102' with cells 104' having a larger size than FIGS. 20B and 20C, and with thinner faces compared to FIGS. 20B and 20C. FIG. 20B shows lattice structure 102" with cells 104" having a smaller size than FIG. 20A and with thicker faces compared to FIG. 20A, but thinner faces than FIG. 20C. FIG. 20C shows lattice structure 102''' with cells 104''' having a similar size to FIG. 20B, but with larger faces than FIGS. 20A and 20B.

Figure 21:
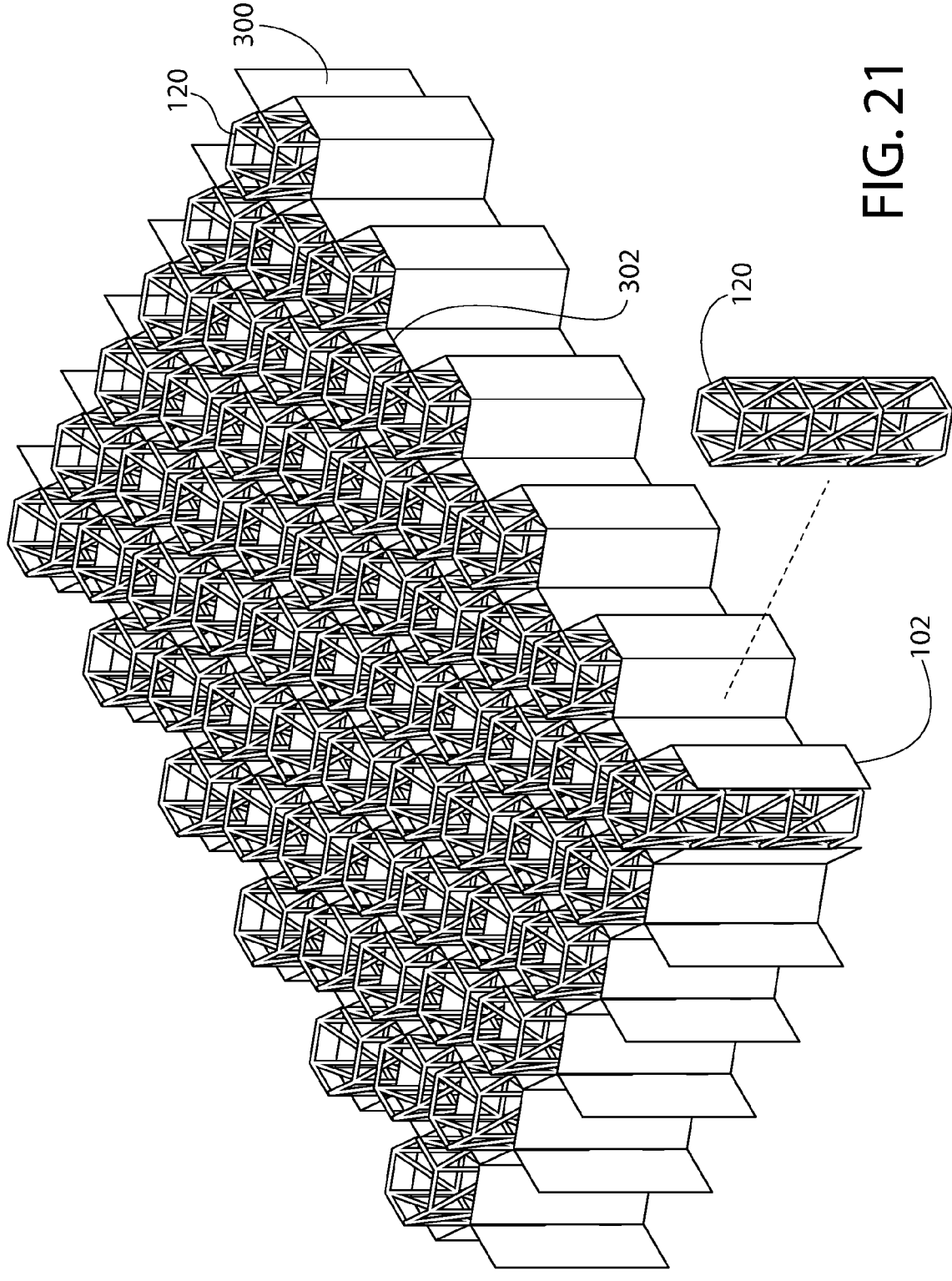
FIG. 21 is a portion of a helmet impact attenuation liner with dual material in accordance with an exemplary embodiment of the present invention.

Referring to FIG. 21, lattice structure 102 may include second 3D structure 300. Second 3D structure 300 may be used to provide additional impact attenuation properties to impact attenuation liner system 100. For example, lattice structure 102 and second 3D structure 300, in combination, may attenuate a force from an impact event more than just lattice structure 102 alone. In another example, second 3D structure 300 may be configured to attenuate high energy impacts, while lattice structure 102 may be configured to attenuate low energy impacts. This results in the combination of lattice structure 102 and second 3D structure 300 attenuating a wider range of impact events compared to lattice structure 102 alone. In one embodiment, second 3D structure 300 may be comprised of a different material than lattice structure 102. Second 3D structure 300 may be comprised of polymeric foams such as EPS, EPP, or polyurethane foam, or other cellular materials such as a sheet of aluminum honeycomb. In a preferred embodiment, second 3D structure 300 is a sheet of aluminum honeycomb. In one embodiment, second 3D structure 300 is a sheet of pre-crushed aluminum honeycomb such as that disclosed in U.S. Pat. No. 11,089,832, which is hereby incorporated by reference in its entirety. Second 3D structure 300 may be pre-crushed to allow for impact attenuation during an impact event. In some embodiments, second 3D structure 300 is a cellular sheet composed of a metallic, ceramic, composite, or polymeric material.

Referring to FIG. 21, second 3D structure 300 may be disposed at least partially within lattice structure 102 such that second 3D structure 300 and lattice structure 102 are overlapping with one another. In one embodiment, the combination of second 3D structure 300 and lattice structure 102 may include a liner to provide comfort to the user. The combination of second 3D structure 300 and lattice structure 102 may include pads 202 discussed above. In some embodiments, lattice structure 102 is configured to be discrete pads (e.g., lattice pads discussed above) and each lattice pad may be surrounded by second 3D structure 300 to provide additional impact attenuation.

In one embodiment, lattice structure 102 includes extending portions or projections 120, which may extend from lattice structure 102. For example, projections 120 may extend from top surface 107 or bottom surface 109 of lattice structure 102. In a preferred embodiment, projections 120 may extend from top surface 107 of lattice structure 102, away from a user's head. Second 3D structure 300 may include openings 302 which may be configured to receive projections 120. In one embodiment, second 3D structure 300 is disposed within lattice structure 102 where projections 120 are disposed within openings 302.

Figure 22:
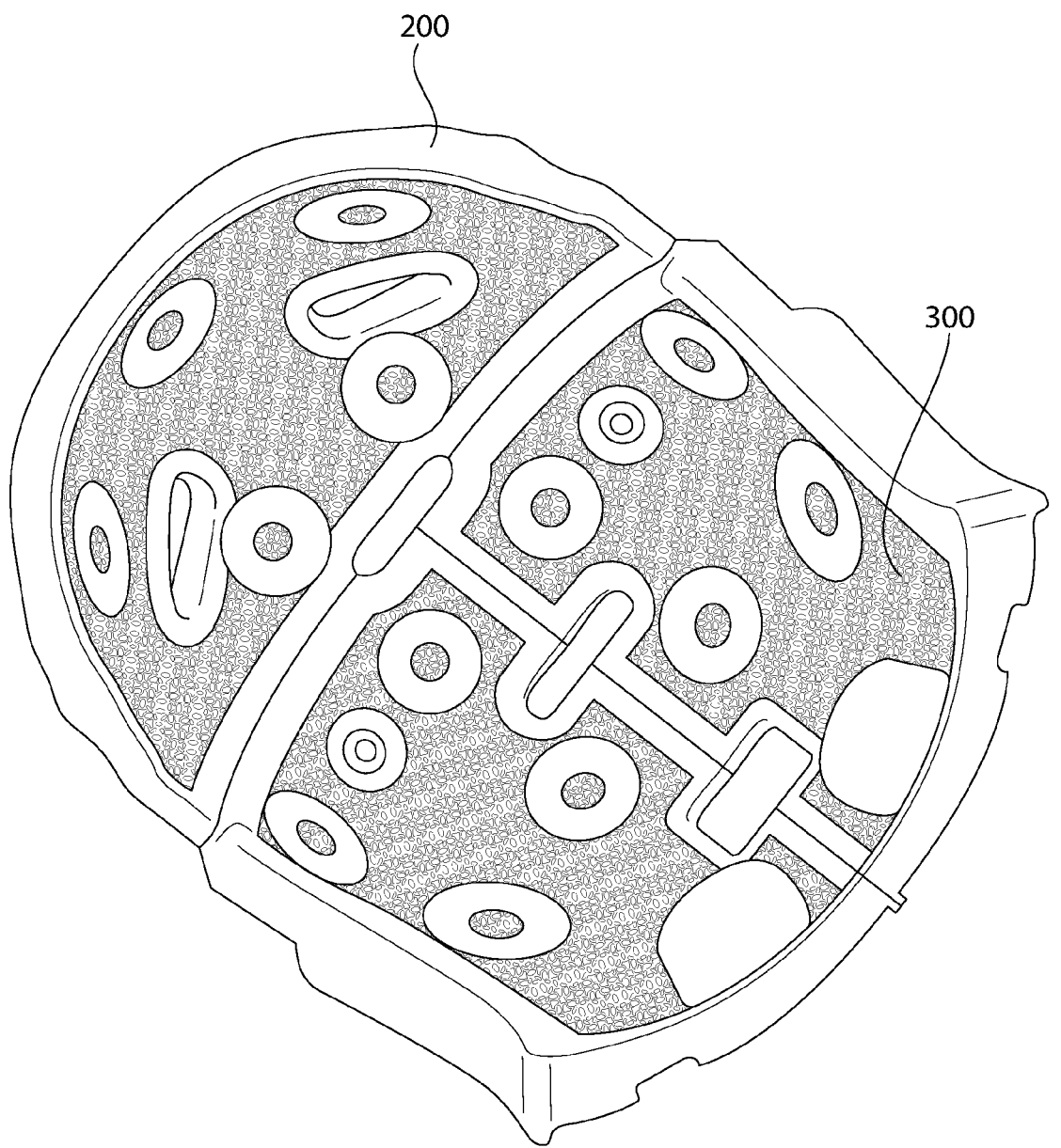
FIG. 22 is a portion of a helmet impact attenuation liner with protective cover in accordance with an exemplary embodiment of the present invention.

Referring to FIG. 22, second 3D structure 300 may be configured to cover the interior of helmet 200. In one embodiment, an adhesive may be used to secure second 3D structure 300 to lattice structure 102 and/or helmet 200. In some embodiments, hooks may be incorporated into lattice structure 102 to couple to and retain second 3D structure 300.

Figure 23:
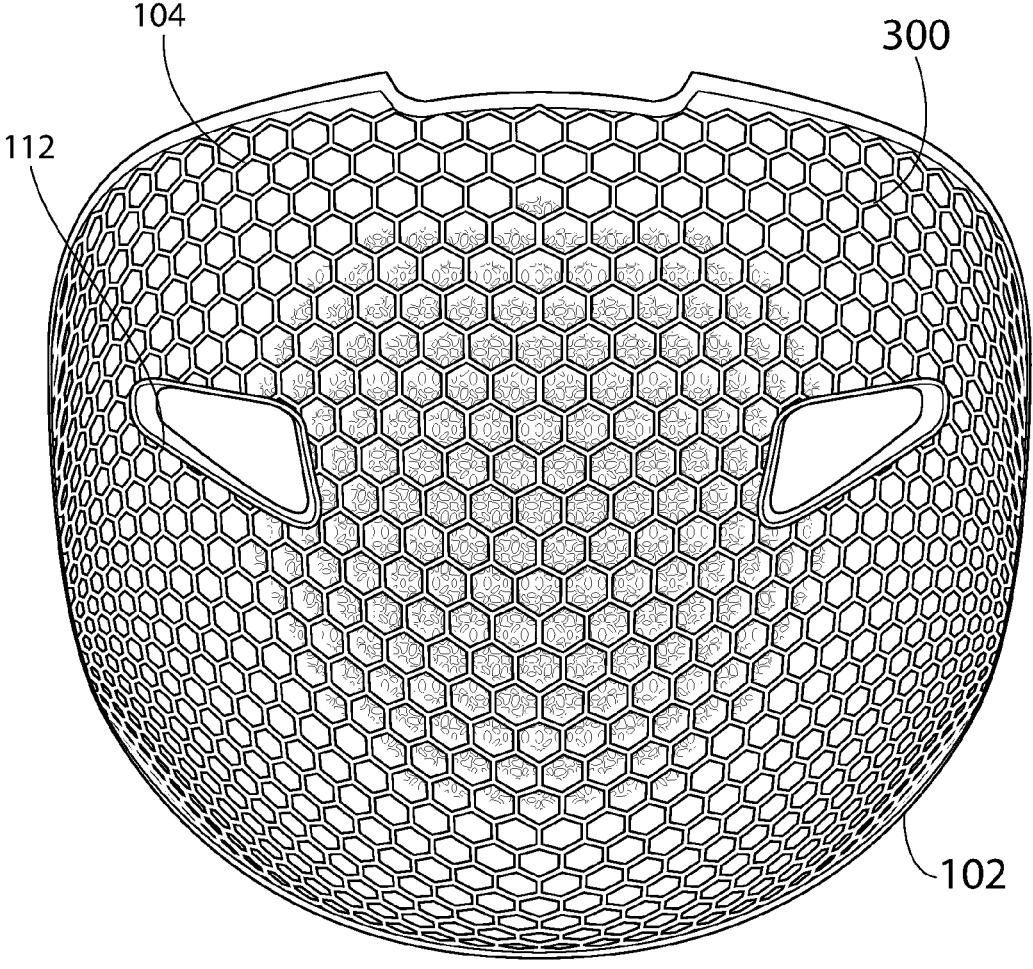
FIG. 23 is a portion of a helmet impact attenuation liner in accordance with an exemplary embodiment of the present invention.
Figure 24:
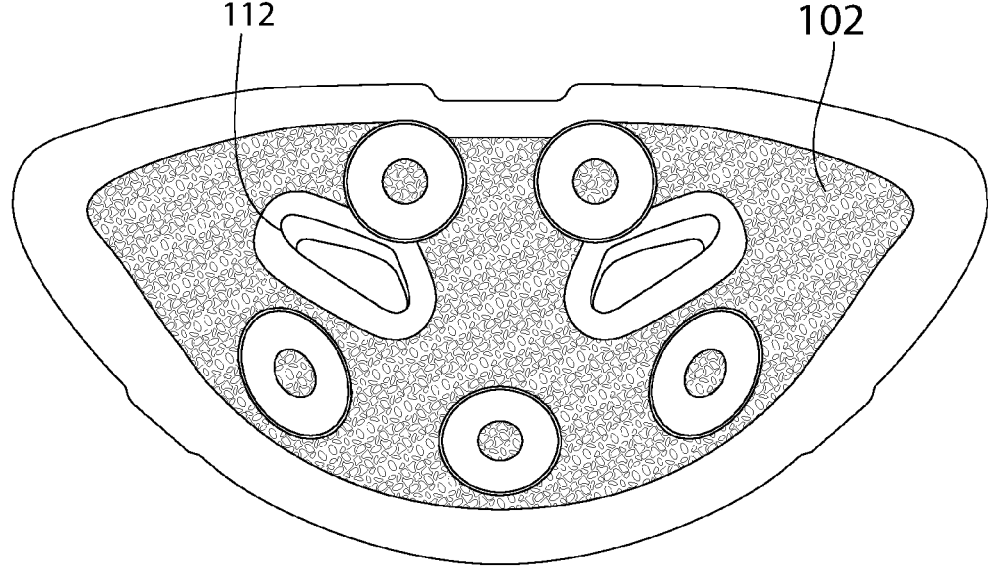
FIG. 24 is a portion of a helmet impact attenuation liner with protective cover in accordance with an exemplary embodiment of the present invention.

In another embodiment, second 3D structure 300 is disposed on top of lattice structure 102. Second 3D structure 300 may be removably attached to lattice structure 102 during use. For example, second 3D structure 300 may be disposed between lattice structure 102 and a shell of helmet 200. Referring to FIGS. 23-24, second 3D structure 300 may be disposed on top of lattice structure 102, such that lattice structure 102 is disposed between the user's head and second 3D structure 300. In yet another embodiment, second 3D structure 300 may be sandwiched between two structures. For example, second 3D structure 300 may be sandwiched between two 3D structures. Second 3D structure 300 being sandwiched between two lattice structures may allow impact attenuation liner system 100 to attenuate higher impact energies. In some embodiments, both lattice structure 102 and second 3D structure 300 may include openings 112. Openings 112 may be configured to provide breathability and airflow to a user's head. For example, both lattice structure 102 and second 3D structure 300 may include openings 112 in the same location such that aligning lattice structure 102 and second 3D structure 300 together results in alignment of openings 112.

Figure 25:
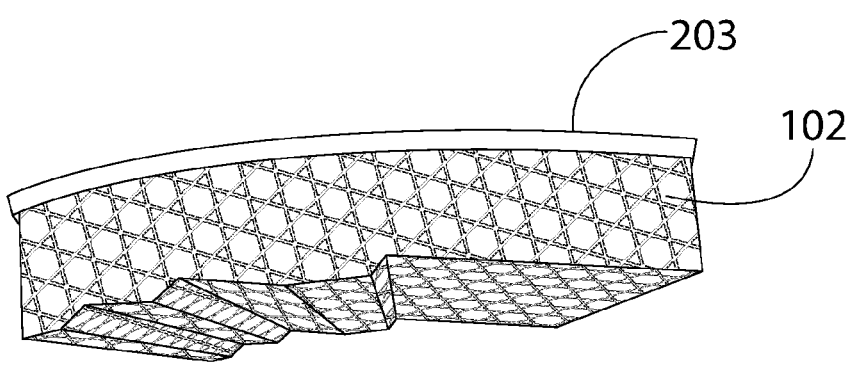
FIG. 25 is a portion of an integrated helmet shell and liner in accordance with an exemplary embodiment of the present invention.
Figure 26:
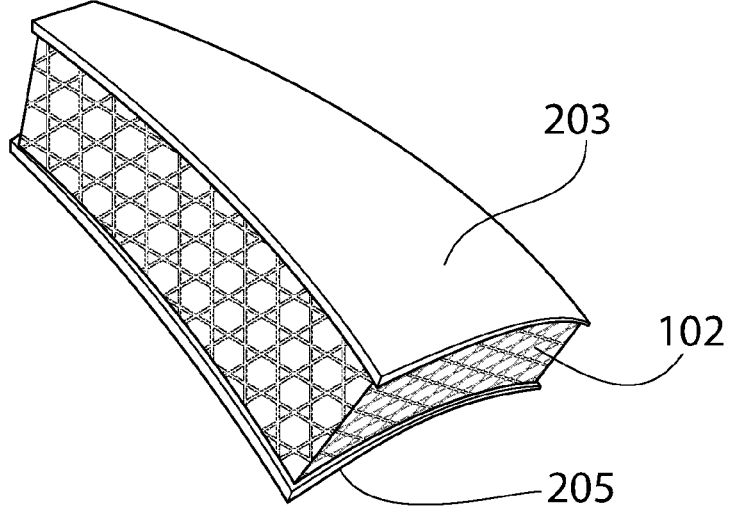
FIG. 26 is a portion of a liner integrated with inner and outer helmet shells in accordance with an exemplary embodiment of the present invention.

Referring to FIGS. 25 and 26, impact attenuation liner system 100 may be used as a fully integrated system with a helmet. For example, as shown in FIG. 25 lattice structure 102 may be fully integrated with exterior helmet shell 203. By way of another example, as shown in FIG. 26, lattice structure 102 may be fully integrated with exterior helmet shell 203 and may include interior helmet shell 205. Interior helmet shell 205 may be an intermediate stiffening layer that may be disposed between lattice structure 102 and a user's head. In some embodiments, the intermediate stiffening layer may function as one or more of exterior helmet shell 203 and interior helmet shell 205. In one embodiment, interior helmet shell 205 may have an elastic modulus ranging from approximately 1 GPa to 200 GPa, approximately 25 GPa to 175 GPa, approximately 50 GPa to 150 GPa, or approximately 75 GPa to 125 GPa. In one embodiment, exterior helmet shell 203 may have an elastic modulus ranging from approximately 1 GPa to 200 GPa, approximately 25 GPa to 175 GPa, approximately 50 GPa to 150 GPa, or approximately 75 GPa to 125 GPa.

Figure 27:
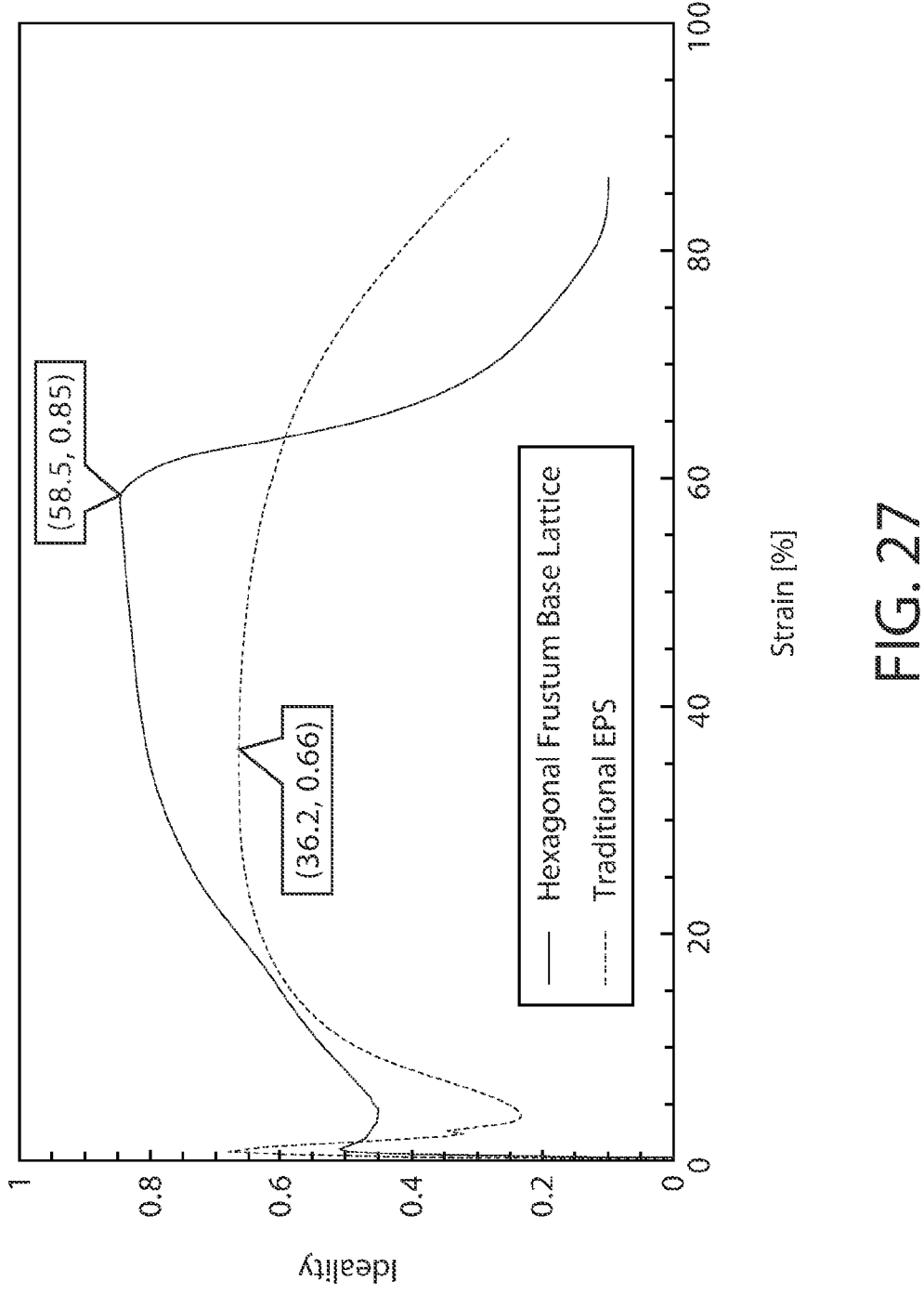
FIG. 27 is a graph of ideality-strain curves of the embodiments of FIG. 11A compared to EPS foam in accordance with an exemplary embodiment of the present invention.

Referring to FIG. 27, an ideality-strain graph comparing unit cells 160 resembling a hexagonal frustum vs EPS foam. The ideality is calculated by integrating the stress-strain curve to calculate specific energy absorbed and dividing that by the energy absorbed by an ideal material. Ideality has a maximum value of 1. Materials are preferred that have an ideality approaching 1 at high strain values indicating that they are capable of absorbing the maximum amount of energy possible without transmitting more than some allowable amount of stress. Further, the ideality-strain graph of FIG. 27 shows that cells 160 resembling a hexagonal frustum is more efficient up to approximately 65% strain. Therefore, unit cells 160 resembling a hexagonal frustum provides better impact attenuation performance compared to EPS foam.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "front", "back", "lower" and "upper" designate directions in the drawings to which reference is made. The words "inwardly" and "outwardly" refer to directions toward and away from, respectively, the geometric center of the impact attenuation system. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. An impact attenuation lattice structure comprising:
a plurality of unit cells, each of the plurality of unit cells having a horizontal plane, a central axis, a first end, a second end opposite the first end, and a plurality of struts forming a plurality of sidewall frames, each of the plurality of sidewall frames angled relative to the central axis such that the second end of each of the plurality of unit cells is wider than the first end, the horizontal plane being perpendicular to the central axis,
wherein the plurality of unit cells are connected to one another to form a lattice structure, a first unit cell of the plurality of unit cells sharing one sidewall frame of the plurality of sidewall frames with a second unit cell of the plurality of unit cells adjacent to the first unit cell, and the second unit cell being in an inverted position about the horizontal plane compared to the first unit cell.

2. The impact attenuation lattice structure of claim 1, wherein each strut of the plurality of struts is coupled end to end to form each of the plurality of sidewall frames such that each of the plurality of sidewall frames forms a geometric shape.

3. The impact attenuation lattice structure of claim 2, wherein the geometric shape is symmetrical about the horizontal plane.

4. The impact attenuation lattice structure of claim 2, wherein the geometric shape is disposed on a plane and includes no cross members.

5. The impact attenuation lattice structure of claim 1, wherein each of the plurality of sidewall frames is connected to another of the plurality of sidewall frames by one or more spacing struts disposed along the horizontal plane.

6. The impact attenuation lattice structure of claim 1, wherein the lattice structure is formed by the plurality of unit cells arranged such that vertically adjacent unit cells are positioned inversely about the horizontal plane relative to each other.

7. The impact attenuation lattice structure of claim 6, wherein the lattice structure is formed by at least six unit cells arranged such that horizontally adjacent unit cells are positioned inversely about the horizontal plane relative to each other.

8. The impact attenuation lattice structure of claim 7, wherein the plurality of unit cells are arranged in alternating inverse position to cumulatively form a substantially hexagonal shape.

9. The impact attenuation lattice structure of claim 1, wherein the lattice structure is formed by the plurality of unit cells arranged such that horizontally adjacent unit cells are positioned inversely about the horizontal plane relative to each other.

10. The impact attenuation lattice structure of claim 1, wherein each of the plurality of sidewall frames is symmetrical about a horizontal plane.

11. The impact attenuation lattice structure of claim 1, wherein each of the plurality of sidewall frames is a closed shape comprising the plurality of struts.

12. The impact attenuation lattice structure of claim 1, wherein each of the plurality of sidewall frames includes no cross members.

13. The impact attenuation lattice structure of claim 1, wherein each of the plurality of unit cells shares at least three sidewall frames.

14. The impact attenuation lattice structure of claim 1, wherein each of the plurality of unit cells shares three sidewall frames with an adjacent unit cell.

15. The impact attenuation lattice structure of claim 1, wherein each of the plurality of unit cells shares at least two sidewall frames with an adjacent unit cell.

16. The impact attenuation lattice structure of claim 1, wherein each of the plurality of sidewall frames is substantially diamond shaped, substantially rectangular shaped, substantially triangular shaped, substantially bowtie shaped, substantially hexagonal shaped, or substantially elliptical shaped.

17. The impact attenuation lattice structure of claim 1, wherein each of the plurality of sidewall frames is angled relative to the central axis from greater than 0° to less than or equal to 30°.

18. The impact attenuation lattice structure of claim 1, wherein each of the plurality of sidewall frames includes an internal angle disposed between two connected struts forming the sidewall frame, the internal angle being from 60° to 280° or greater than or equal to 180°.

19. The impact attenuation lattice structure of claim 1, wherein one of the plurality of sidewall frames of one unit cells is adjacent to another of the plurality of sidewall frames of the same unit cell without horizontal overlap between the one and the other plurality of sidewall frames.

20. The impact attenuation lattice structure of claim 1 further comprising:
a plurality of layers comprised of at least two lattice structures, wherein the at least two lattice structures are stacked vertically such that one lattice structure is vertically adjacent to another lattice structure.

21. The impact attenuation lattice structure of claim 1, wherein each of the plurality of sidewall frames is disposed on a plane.

22. The impact attenuation lattice structure of claim 1, wherein each of the plurality of sidewall frames includes a top and a bottom, the top being proximate to the central axis compared to the bottom.

23. The impact attenuation lattice structure of claim 1, wherein the lattice structure is non-continuous and includes an impact pad.

24. A helmet comprising:

a helmet shell having an inner surface; and a liner coupled to the inner surface of the helmet shell, wherein at least one zone of the liner is comprised of a tessellation of the impact attenuation lattice structure of claim 1.

25. The impact attenuation lattice structure of claim 1, wherein each unit cell of the plurality of unit cells has a geometry resembling a frustum.

26. An impact attenuation lattice structure comprising:

a plurality of unit cells, each of the plurality of unit cells having a horizontal plane, a central axis perpendicular to the horizontal plane, a first end, a second end opposite the first end, and a plurality of struts forming a plurality of sidewall frames, each sidewall frame having a geometric shape devoid of cross members and being angled relative to the central axis such that the second end of each of the plurality of unit cells is wider than the first end, each of the plurality of sidewall frames disposed along a perimeter of the unit cell and coupled together by one or more spacing struts, wherein the plurality of unit cells are connected to one another to form a lattice structure, a first unit cell of the plurality of unit cells sharing one sidewall frame of the plurality of sidewall frames with a second unit cell of the plurality of unit cells adjacent to the first unit cell, the second unit cell being in an inverted position about the horizontal plane compared to the first unit cell.

27. The impact attenuation lattice structure of claim 26, wherein each of the plurality of sidewall frames is angled relative to the central axis by between greater than 0° and less than or equal to 30° and each of the plurality of sidewall frames includes a top and a bottom, the top being proximate the central axis compared to the bottom and each of the plurality of sidewall frames includes an internal angle disposed between two connected struts forming the sidewall frame, the internal angle being from 60° to 280°.

\* \* \* \* \*